United States Patent [19]
Kulas

[11] Patent Number: 5,734,862
[45] Date of Patent: Mar. 31, 1998

[54] SYSTEM FOR SELECTIVELY BUFFERING AND DISPLAYING RELEVANT FRAMES FROM INTERLEAVING FRAMES ASSOCIATED WITH RESPECTIVE ANIMATION SEQUENCES STORED IN A MEDIUM IN RESPONSE TO USER SELECTION

[76] Inventor: Charles J. Kulas, 25 Capra Way #305, San Francisco, Calif. 94123

[21] Appl. No.: 252,460

[22] Filed: May 31, 1994

[51] Int. Cl.⁶ .................................................. G06F 13/00
[52] U.S. Cl. ........................ 395/484; 395/173; 395/427; 395/849; 395/872; 360/18; 360/48
[58] Field of Search ................... 369/47, 48; 345/22; 348/155, 483; 360/48, 18; 386/52, 92; 395/173, 680, 427, 481, 484, 849, 872; 463/3, 4

[56] References Cited

U.S. PATENT DOCUMENTS

| | | | |
|---|---|---|---|
| Re. 33,662 | 8/1991 | Blair et al. | 463/3 |
| 3,743,087 | 7/1973 | Harrison, III et al. | 345/22 |
| 4,475,132 | 10/1984 | Rodesch | 386/92 |
| 4,789,894 | 12/1988 | Cooper | 348/155 |
| 4,847,690 | 7/1989 | Perkins | 348/483 |
| 5,113,493 | 5/1992 | Crosby | 395/173 |
| 5,339,413 | 8/1994 | Koval et al. | 395/680 |
| 5,359,468 | 10/1994 | Rhodes et al. | 360/48 |
| 5,390,158 | 2/1995 | Furuhashi | 369/47 |
| 5,404,437 | 4/1995 | Nguyen | 395/152 |
| 5,428,731 | 6/1995 | Powers, III | 395/154 |
| 5,434,678 | 7/1995 | Abecassis | 386/52 |
| 5,446,714 | 8/1995 | Yoshio et al. | 369/48 |
| 5,462,275 | 10/1995 | Lowe et al. | 463/4 |
| 5,502,807 | 3/1996 | Beachy | 395/152 |
| 5,519,825 | 5/1996 | Naughton et al. | 395/152 |

FOREIGN PATENT DOCUMENTS

| | | |
|---|---|---|
| 1-287872 | 11/1989 | Japan. |
| 2-121584 | 5/1990 | Japan. |

OTHER PUBLICATIONS

"The muddy road to desktop video: Mac companies fudge facts in 'spec wars.'", Digital Media Nov. 10 1992, v2 No. 6 p. 13 (4).

"CD-ROMs drive toward new standards.", Datamation, Feb. 15 1993, v39 No. 4 p. 57 (3).

"Multimedia: Sigma Designs unveils $299 video capture & play-back multimedia adapter for the PC.", Edge: Work-Group Computing Report, Jun. 14 1993, v4 No. 160 p. 12 (1).

"A File System for Continuous Media", David P. Anderson et al., ACM Transactions on Computer Systems, vol. 10, No. 4, Nov. 1992, pp. 311–337.

"Designing File Systems for Digital Video and Audio", P. Venkat Rangan et al., Operating Systems Review, vol. 25, No. 5, Oct. 13–16, 1991, pp. 81–94.

*Primary Examiner*—Thomas C. Lee
*Assistant Examiner*—Po C. Huang

[57] ABSTRACT

A system for eliminating access time in CD-ROM based interactive video applications. A CD-ROM disc is formatted with multiple interleaved animation sequences. During playback, a user is able to select a sequence as the current sequence. Only those frames corresponding to the current sequence are displayed while other frames are dropped. The interleaved pattern of frames allows multiple sequences to be available from the CD-ROM drive without requiring repositioning of the CD-ROM drive's read head thereby eliminating access time. Specific patterns of interleaving that advantageously improve interactivity of an interactive production are described. A frame buffering implementation is described.

9 Claims, 17 Drawing Sheets

SYSTEM FOR SELECTIVELY BUFFERING AND DISPLAYING RELEVANT FRAMES FROM INTERLEAVING FRAMES ASSOCIATED WITH RESPECTIVE ANIMATION SEQUENCES STORED IN A MEDIUM IN RESPONSE TO USER SELECTION

BACKGROUND OF THE INVENTION

This invention relates generally to displaying animation sequences in a computer system and specifically to displaying video data from a compact disc read only memory (CD-ROM) device in a computer system running an interactive application.

Interactive productions allow a user of a computer system to interact with movies, video or other displayed images while the images are being updated at a rapid rate. The purpose of these productions is to present useful information, educate or entertain the user. The ultimate goal of interactive technology is to make the user feel as though they are interacting with images on the screen so that, for example, characters or objects in a drama react to the users actions. The user's actions can affect characters, objects or other images on the display screen and change the course of the storyline.

One method for providing a high degree of interaction is to make the production completely computer generated. This means that the computer models a three dimensional world and calculates and displays the orientation of figures and objects on the screen. However, this approach is limited by today's technology because the computing power to fully calculate and render lifelike images, especially human figures, at resolutions approaching television quality in real time at video or film refresh rates is beyond the current technology for mass-marketed systems.

A different approach is to prerecord video, film or computer generated image sequences and play the prerecorded images, or frames, back at high speed. This achieves the resolution of television, or better, and is sufficiently lifelike to create a level of believability comparable to television. However, in this approach the user has a very limited amount of interactivity with the production since the user's ability to affect the story is limited to the small number of different "paths" of prerecorded image sequences that are branched to at predetermined decision points in the video or animation sequence. The use of any prerecorded sequences of images that are played back so as to achieve animation while allowing a user to interact with the images is referred to broadly here as "interactive video."

Interactive video productions typically use a compact disc read-only memory (CD-ROM) disc to store the images and a CD-ROM drive to retrieve images during playback. The CD-ROM disc stores information in a concentric spiral on optical media and is "read" or played back with a CD-ROM drive that uses a "read head" with a laser beam. The big problem with CD-ROM based interactive production is the break in continuity due to delays of about a half-second or more required to locate a desired branch path that is different from the current path that the drive's read head is tracking. Another problem is that CD-ROM based interactive video productions are severely limited in the number and types of ways that a user may interact with the video.

The length of time to access a different video path ("access time" or "seek time") depends upon the location of the different video path with respect to the current placement of the CD-ROM drive's read head. In order to access a given video sequence, a computer controller looks up the location of the sequence in an index and instructs the CD-ROM drive to access the new sequence by moving the read head to the beginning of the new sequence on the disc. Since the read head is moved by a mechanical mechanism it takes a comparatively long time to reposition the read head to a new point on the track to access the different video path.

The prior art uses caches to try to improve the performance of accessing data in a CD-ROM. The cache can be in the CD-ROM drive, in an interface card between the processor and the drive, in the memory of the computer system controlled by software or even on a hard disk or other storage medium. However, these caches only provide marginal improvement in access times where video is concerned because of the relatively small sizes of the caches compared to the data rate of the information coming off of the CD-ROM. Also, when a different path is branched to the information in the caches is usually useless since they don't contain the new data. The caches must be "purged" and loaded with new information.

While current CD-ROM drives are not adequate to provide sufficient interactivity in interactive video productions, they represent a huge installed base since hundreds of thousands have already been sold to consumers. Therefore, a system which eliminates the access time in CD-ROM based interactive videos without requiring modification of existing CD-ROM drives is desired. Further, a system that allows an interactive video production to use many paths to improve interactivity without suffering degraded performance is desired.

SUMMARY OF THE INVENTION

The invention uses a special formatting of a CD-ROM disc where portions of a first animation sequence are interleaved with portions of a second animation sequence on the CD-ROM disc itself. The invention also takes special advantage of the interleaved information during playback of the CD-ROM to completely eliminate the necessity of moving the read head in the CD-ROM drive while playing back an interactive video production. The invention uses several patterns of interleaved animations to provide vastly improved interactivity.

The invention works to special advantage with image compression techniques and with caches. Other advantages of the present invention will be apparent.

In one embodiment, the system of the present invention executes on a computer and includes a method of creating an interactive production on a CD-ROM. In the method, first and second animation sequences of digital frames are created and the animation sequences of frames are written to the CD-ROM by interleaving the frames of the first animation sequence with the frames of the second animation sequence to create the interactive production.

Another embodiment of the invention provides for playing back an interactive production created as described above. A computer system is used that includes a processor, user input device and display screen. The computer system is coupled to a CD-ROM drive. The following steps are performed under the control of the processor: continuously reading the interleaved frames from the CD-ROM; displaying only the frames of a first animation sequence on the display screen to play back a first animation; accepting signals from the user input device selecting a second animation sequence; and, in response to the signals from the user input device, displaying only the frames of the second animation sequence on the display screen to play back the second animation.

DETAILED DESCRIPTION OF A PREFERRED EMBODIMENT

First, various schemes for formatting sequences of interleaved frames on a CD-ROM are discussed in part I. Next, a buffering system for using the interleaved frames in order to eliminate access time is described in part II. Finally, specific interleaving patterns for providing improved interactivity are presented in part III.

I. Interleaved Formatting

Figure 1:
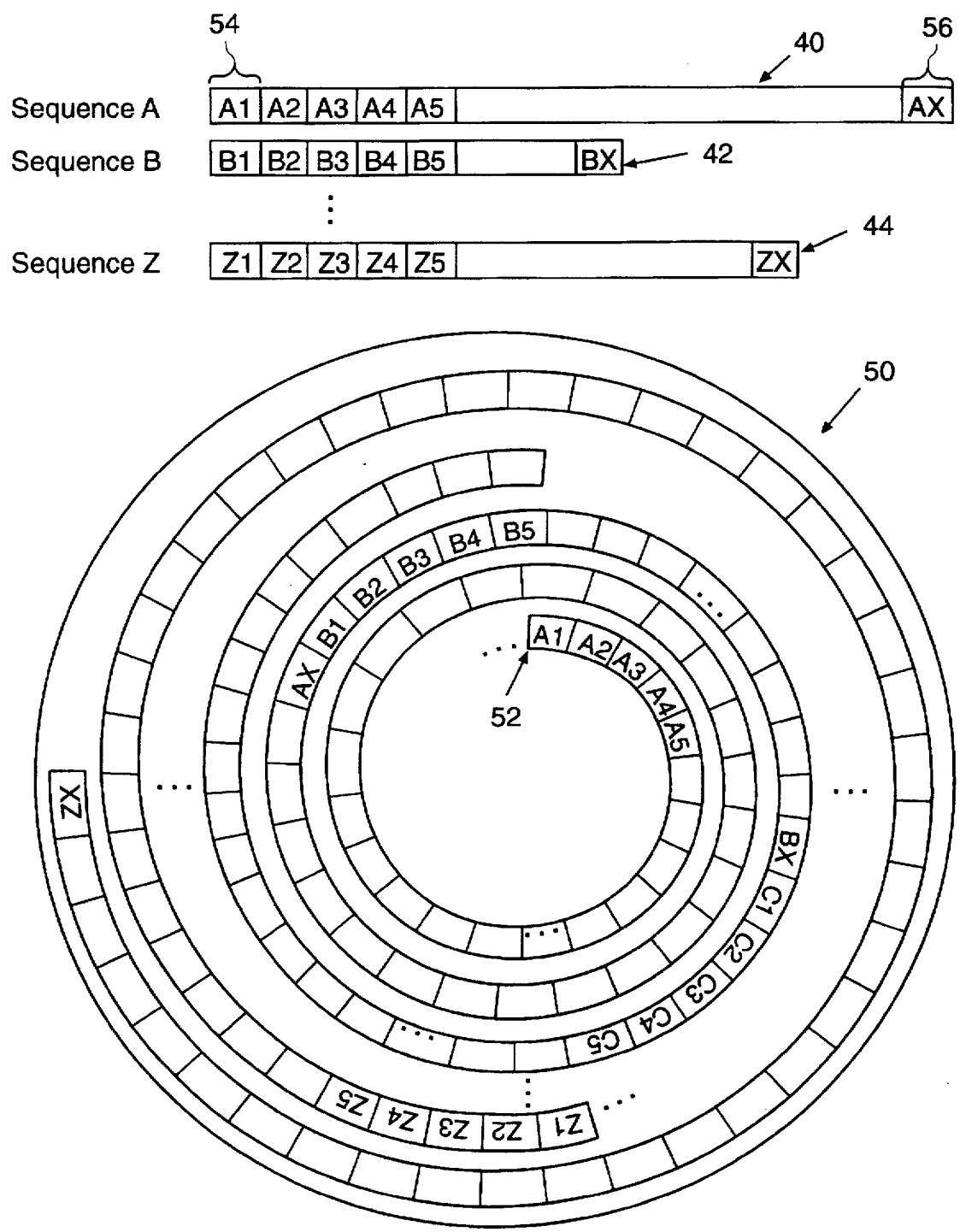
FIG. 1 shows a prior art CD-ROM disc formatting.

FIG. 1 illustrates the prior art formatting of a CD-ROM. FIG. 1 shows sequences of frame information such as sequences 40, 42 and 44. These sequences are made up of frames such as first frame 54 and last frame 56 of sequence A. For ease of discussion, the frames and sequences are referred to by their alphanumeric labels. Thus, sequence A starts with frame A1 and ends with frame AX.

The animation sequences, or merely "sequences," may be frames in video, film, computer graphic, or other formats and are of arbitrary length. Any ordered sequence of frames that are played back to cause a viewer to perceive animation is referred to here as a "sequence." Further, these formats may be mixed together on a CD-ROM.

As shown in FIG. 1, sequence A is made up of frames prefixed by A with a frame number suffix, such as frames A1, A2, A3, ... AX, with AX denoting the final frame in sequence A. Similarly, sequence B is made up of frames B1, B2, B3, ... BX and sequence Z has frames Z1, Z2, Z3, ... ZX. The sequences may be of different and arbitrary lengths and there may be an arbitrary number of different sequences on the CD-ROM up to the maximum capacity of the CD-ROM.

FIG. 1 shows a prior art CD-ROM disc (or merely "CD-ROM") 50. The CD-ROM has a starting point on its spiral track at 52. At the starting point the frames of sequence A have been written on the CD-ROM so that frames A1, A2, A3, ... AX appear as the spiral is traversed outward. Following AX is the first frame of the next sequence, namely, sequence B so that frames B1, B2, B3, ... BX follow frame AX.

Note that FIG. 1 is only a conceptual illustration for ease of discussion. In actuality, each frame is a rather large linear track of information that is stored on the CD-ROM as a series of binary digits of data. For example, one popular frame format is 640×480 pixels of resolution per frame. Assuming each pixel requires 24 bits of information, this comes to 7,372,800 bits of data, or 900 kilobytes (kB) per frame. In FIG. 1, a frame is illustrated as a small block wherein it is actually an elongated portion of a very thin spiral track on the CD-ROM. Also, each CD-ROM has many more "loops" in its spiral track than are shown in FIG. 1.

Figure 2:
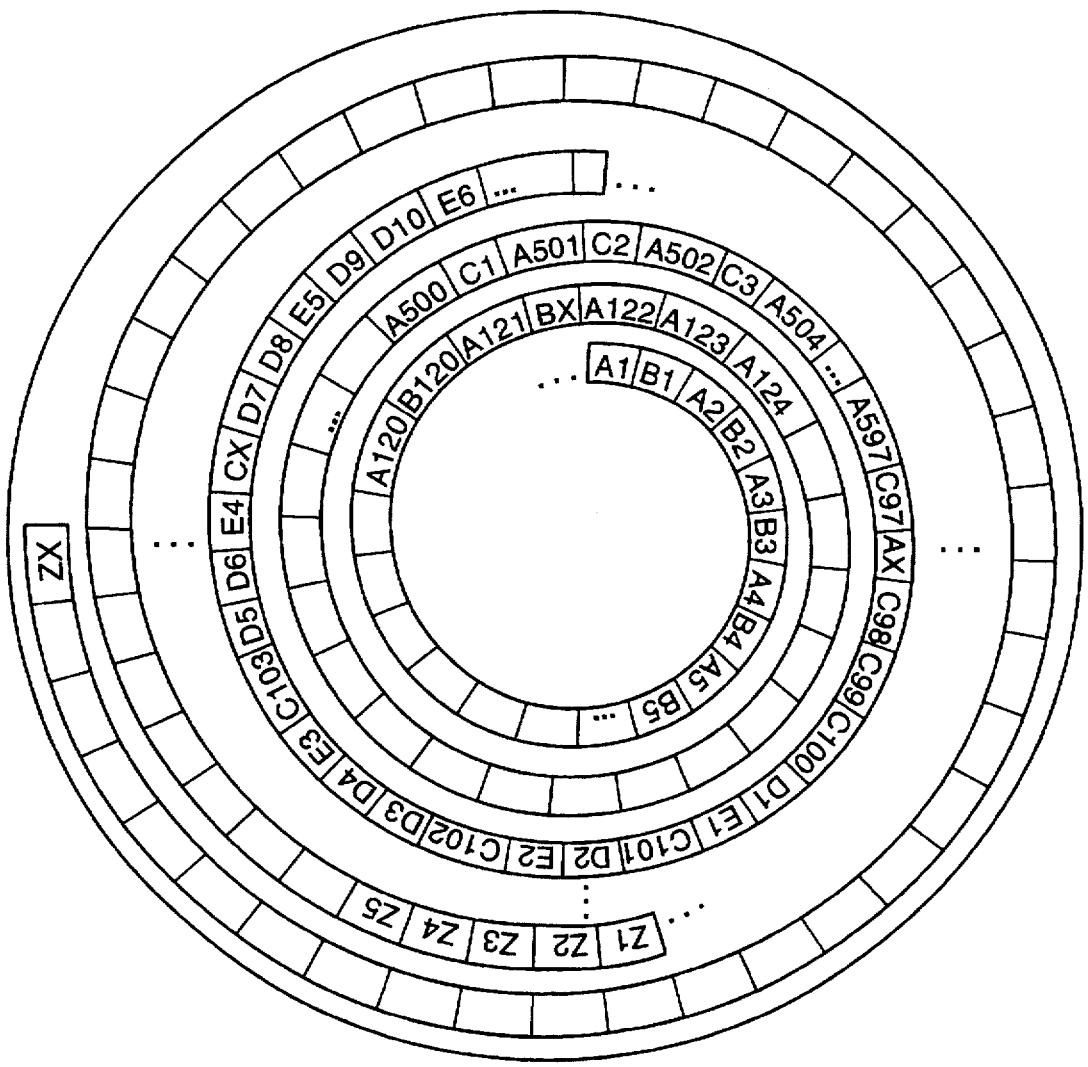
FIGS. 2, 2A, and 2B show the formatting of a CD-ROM disc according to the present invention.

FIG. 2 shows the formatting of a CD-ROM according to the present invention.

In FIG. 2, sequence A and sequence B are written to the CD-ROM with their frames interleaved. Thus, the track for the CD-ROM of FIG. 2 begins with frames as follows: A1, B1, A2, B2, A3, B3, etc. At some point in the interleaved series, sequence B will end since it is shorter than sequence A. This is shown just before the start of the second loop by the sequence A120, B120, A121, BX, A122, A123, A124, . ... Note that after the last frame, frame BX, in sequence B multiple frames from sequence A follow in a non-interleaved fashion. Interleaving does not have to be present for an entire sequence, such as sequence A, on the CD-ROM.

Another interleaving possibility is shown after the start of the third loop in the series of frames A500, C1, A501, C2, A502, .... This shows a sequence C interleaved with the remaining frames of sequence A. Thus, a sequence may be interleaved to end within another sequence or to start within another sequence. The first example is shown where sequence B ends within sequence A and the second example is shown where sequence C starts within sequence A.

Other interleaving schemes are possible. For example, sequence A ends partway through the third loop at frame AX. After frame AX the frames C98, C99, C100, D1, E1, C101, D2, E2, C102, ... are written. This series of frames shows two sequences, sequence D and sequence E, both starting within sequence C. The series thus includes three sequences interleaved equally. Any number of sequences may be interleaved within a series of frames. The limitation on the number of sequences that may be interleaved depends upon the transfer rate of information from the CD-ROM to the application program performing the display function as described below and the rate at which frames are updated on the display.

Interleaving need not be uniform. For example, FIG. 2 shows the series D3, D4, E3, C103, D5, D6, E4, CX about three-quarters of the way through the third loop. This shows two frames from sequence D written to the CD-ROM followed by a frame from sequence E and a frame from sequence C. Thus, many variations of interleaving schemes are possible with the present invention.

One or more interleaving schemes may be used on a single CD-ROM. Also, the prior art formatting of non-interleaved sequences may be included with instances of interleaving as shown in FIG. 2 by non-interleaved sequence Z at the end of the track.

A "frame" need not consist only of image data. In a preferred embodiment, the interleaving schemes are used for audio data as well as for image data. A portion of an audio track is included in each frame corresponding to a time interval occupied by the display of the frame image data upon playback. For example, at the video rate of 30 frames per second (fps) an audio portion of 1/30 second of speech, sound effects, music, etc., can be included adjacent to its corresponding frame. Other methods of associating audio data with interleaved frames are possible.

Interleaving may occur with amounts of information less that a complete frame. Portions of frames may be interleaved so that, for example, where a frame is 640 columns by 480 rows, single rows or groups of rows from a frame of a first sequence may be interleaved with single rows or groups of rows from a frame of a second sequence. Also, information other than frame data can be included in each of the "frames" shown in FIG. 2 so that other useful information may be associated with, or read conveniently while reading, frame information.

One type of data that is useful to keep associated with frame information is a frame "tag" or identification (ID) number. A tag is useful to decide which frames to display and which frames to "drop" during frame selection as discussed below. Other types of information such as multi-frame branching information, buffering information, etc., can be put on the CD-ROM within or adjacent to the frames, or between series' of frames on the CD-ROM.

Interleaving is also used advantageously with compression techniques. As is known in the art, compression techniques reduce the amount of data needed to represent information such as a frame. Popular compression techniques such as Motion Picture Experts Group (MPEG) currently achieve about 25:1 compression ratios thus reducing the amount of data to about one twenty-fifth of the original requirement. Compressed frames may be inter-leaved as described above. Similarly, where portions of frames are interleaved the frame portions may be compressed. Any information needed by decompression routines to later decompress the information can be stored with the compressed information within the frame on the CD-ROM, between frames or in a different portion of the CD-ROM.

Some compression schemes are "inter-frame." This means that the compression/decompression ("codec") scheme of one frame depends on the data in a different frame. Where inter-frame compression is used it is usually more advantageous to do the compression between frames in the same sequence. That is, where two sequences are inter-leaved one frame at a time the inter-frame codec is best achieved by skipping frames so that, to the codec routines, it is as if the frames are non-interleaved. However, some advantages may be found by performing inter-frame codec on adjacent frames in an interleaved series. This is especially true where the interleaved frames differ only slightly from each other even though they are from different sequences. This is a common occurrence in interactive video productions using branch points where the action in the scene branches from a single frame into two gradually differing sequences.

The CD-ROM track need not be a spiral in order for the present invention to function. Any track arrangement that allows continuous reading of data from the CD-ROM in one mode is suitable for use with the present invention. For example, the CD-ROM track could have many concentric circles instead of a continuous spiral. This is similar to the format for magnetic media floppy and hard disk drives. Floppy and hard drives suffer from a similar, although less pronounced, problem in access time since they, too, use mechanical mechanisms to move read heads when it becomes necessary to look for data in different video paths. The advantage of interleaving is that it allows multiple sequences of animation to be available during playback of the CD-ROM (or other similar media) without requiring the slow mechanical repositioning of the read head. Thus the present invention is adaptable to a floppy or hard disk by formatting the floppy or hard disk in the interleaved manner as described herein.

Frame interleaving may also be used without a CD-ROM as where animated sequences are transmitted over a cable, fiber optic line, or other data link, or by electromagnetic transmission. For example, where an interactive video production is transmitted via cable to a user's home computer or television (computer/tv) frame interleaving could be used by alternating the transmission of frames in the transmitted signal. In other words, instead of writing the information to a CD-ROM disc the information could be transmitted in the ordering shown in FIG. 2 over a transmission medium. The user interaction with respect to decision points and the operation of the playback software at the user's computer/tv would be the same as where the information is read from a CD-ROM disc that is local to the user's computer as described above.

Figure 2A:
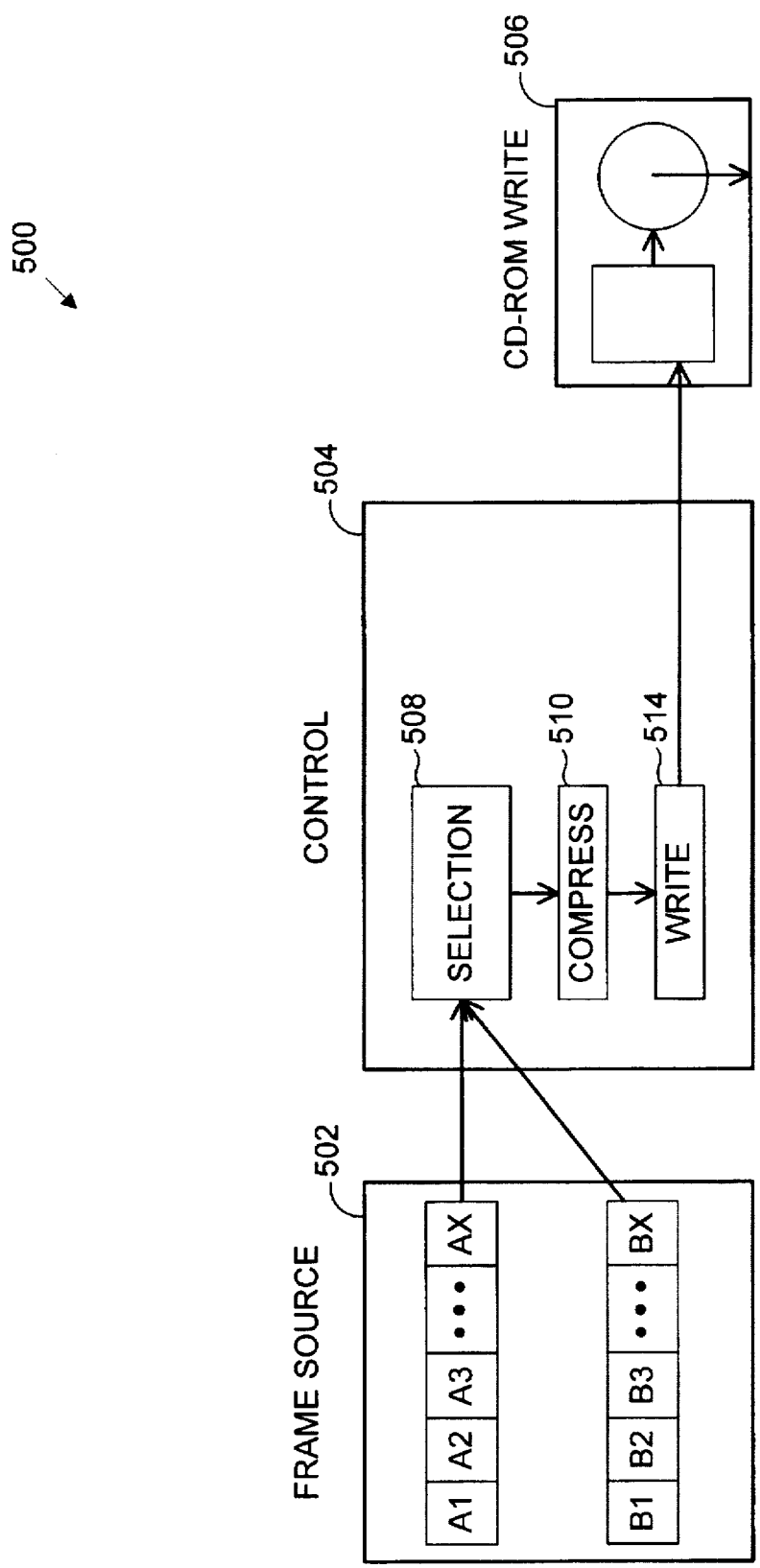

FIG. 2A is a simple block diagram of a system suitable for use in creating a CD-ROM with an interleaved frame format such as the frame format shown in FIG. 2.

In FIG. 2A system 500 includes a frame source 502, control unit 504 and CD-ROM record device 506. Frame source 502 may be a hard disk or other media where the frames of at least two separate animation sequences are stored in a digital format. Control unit 504 is preferably a digital computer executing software allowing a user to specify the any of the interleaving patterns discussed above. In a preferred embodiment, boxes within control unit 504 in FIG. 2A are implemented as software processes executed by a central processing unit (CPU) in a digital computer, such as the computer system described below in connection with FIGS. 3 and 4. The software processes use various computer system resources such as buses, I/O ports, etc. to accomplish their tasks as is known in the art.

Selection process 508 chooses between frames from sequence A and B according to the user's specifications. Selection process 508 sends each selected frame to compression process 510. Compression is used in a preferred embodiment of the invention but is not necessary to practice the present invention. Compression process 510 compresses each frame according to any of a variety of known compression techniques, e.g., MPEG. Once compressed, write process 514 writes each frame to CD-ROM record device 506 according to the order determined by selection process 508. Suitable CD-ROM recording devices are, e.g., Kodak PCD Writer 200 or Philips CDD-521.

Thus, system 500 is capable of creating a CD-ROM disc in any of the interleaved formats discussed above.

Figure 2B:
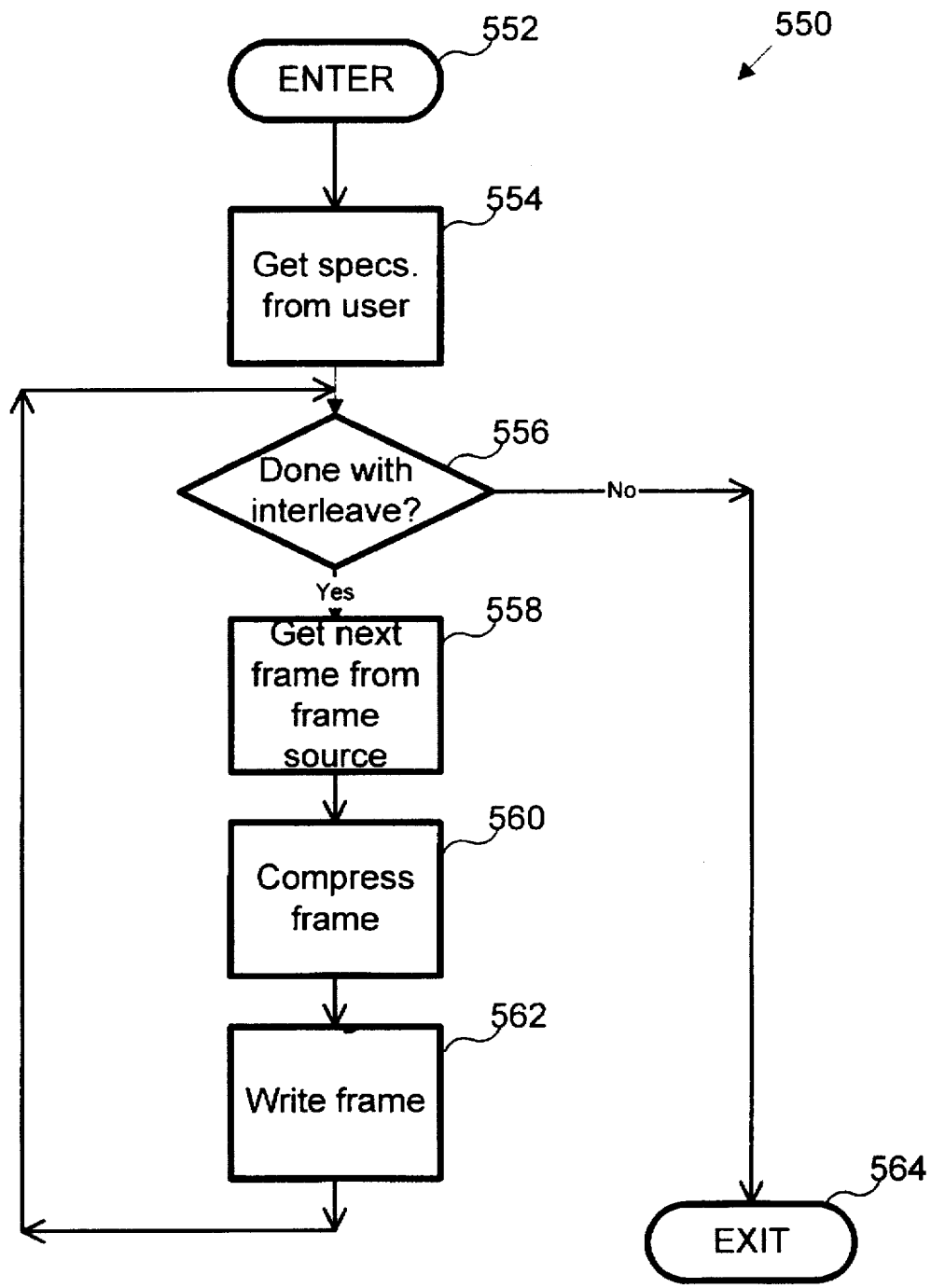

FIG. 2B shows flowchart 200 illustrating the basic steps in creating a CD-ROM with interleaved formatting. The method illustrated in the flowchart of FIG. 2B may be used with the system shown in FIG. 2A.

The routine of flowchart 550 is entered at step 552 where it is assumed that multiple animation sequences made up of frames are residing on a storage device that is used as the frame source. At step 554 the user specifies the sequences to interleave and the type of interleaving. Next, step 556 is executed where a check is made as to whether the interleaving is completed. Assuming that there are still more frames to interleave, execution of the routine proceeds to step 558 where the next frame is obtained from the frame source according to the interleaving specifications selected by the user at step 554, above.

Once step 558 completes, step 560 is executed to compress the frame. Again, compression is optional. Next, the frame is written to the CD-ROM recording device at step 562 and steps 556–562 are repeated as necessary until the interleaved series consisting of the sequences selected by the user is completely written to the CD-ROM disc inside the CD-ROM recording device. When there are no more frames to write, execution of the routine of flowchart 550 terminates at step 564.

II. Frame Selection During Playback

During the playback of an interactive video production according to the present invention interleaved frames are read continuously from the CD-ROM disc. Frames from a desired sequence are displayed while frames from undesired sequences in the same series as the desired sequence are not displayed. I.e., they are "dropped." In an ideal system, the rate of frames transferred from the CD-ROM drive would be constant and be a direct multiple of the display "frame refresh rate" so that, for example, where there are 5 possible sequences in a system where frames are displayed every 1/30th second the CD-ROM transfers 5 frames every 1/30th second and one of the 5 frames is displayed. However, because of variations in the transfer rate, system resource conflicts, limitations of the processing power, etc., a real-world implementation of the present invention buffers the frames prior to their selection and display.

The following discussion describes how a computer system is used to play back the frames stored in an interleaved pattern on a CD-ROM as discussed above. First, an overview of hardware and software used in the playback of an interactive video production is presented. Next, a way to select and drop frames is discussed followed by a discussion of a specific implementation.

A. Overview of Hardware and Software in the Data Path

Figure 3:
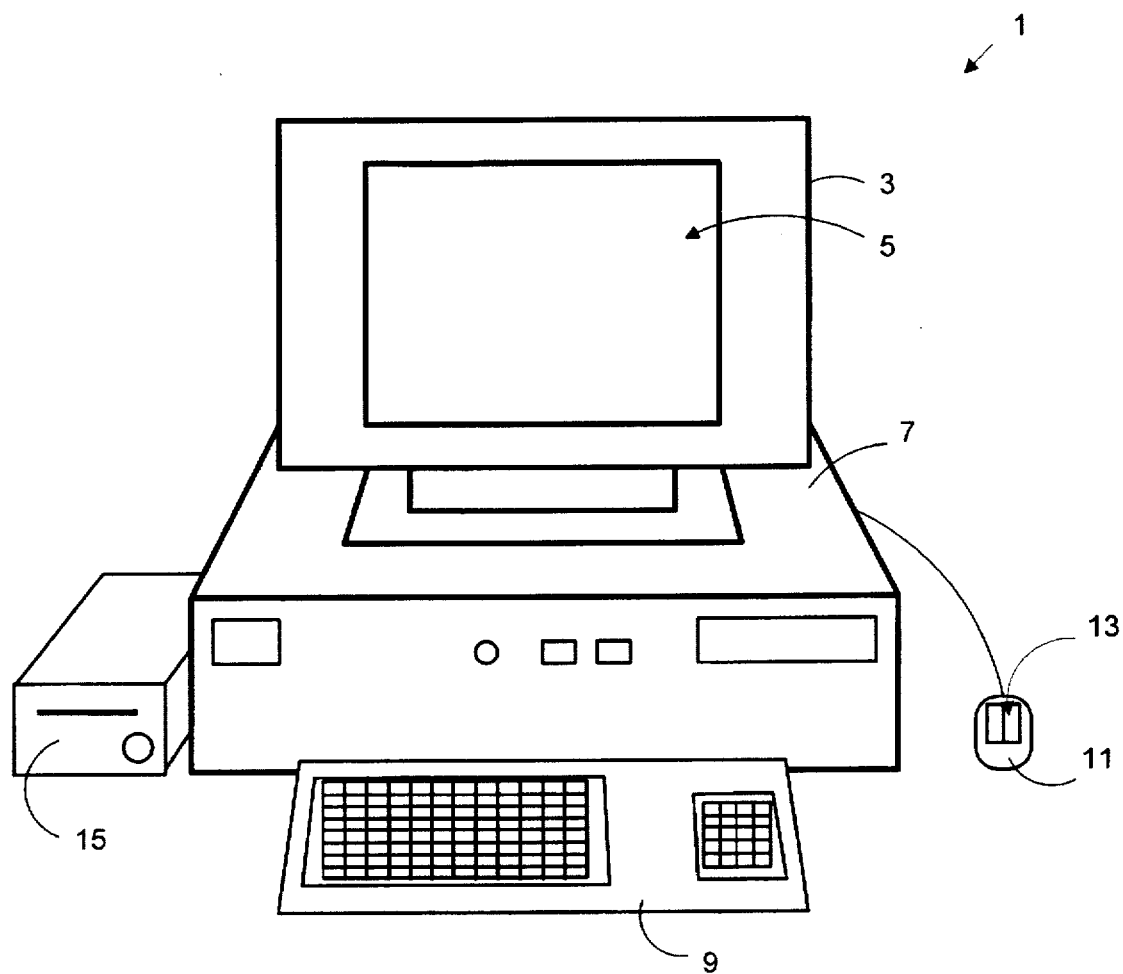
FIG. 3 is an illustration of a computer system suitable for use with the present invention.

FIG. 3 is an illustration of a computer system suitable for use with the present invention. FIG. 3 depicts but one example of many possible computer types or configurations capable of being used with the present invention. FIG. 3 shows computer system 1 including display device 3, display screen 5, cabinet 7, keyboard 9 and mouse 11. Mouse 11 and keyboard 9 are "user input devices." Other examples of user input devices are a touch screen, light pen, track ball, data glove, etc.

Mouse 11 may have one or more buttons such as buttons 13 shown in FIG. 3. Cabinet 7 houses familiar computer components such as CD-ROM drives, disk drives, a processor, storage means, etc. As used in this specification "storage means" includes any storage device used in connection with a computer system such as CD-ROM drives, disk drives, magnetic tape, solid state memory, bubble memory, etc. Cabinet 7 may include additional hardware such as input/output (I/O) interface cards for connecting computer system 1 to external devices such as external CD-ROM drive 15, or other devices (not shown) such as an optical character reader, external storage devices, other computers, etc.

Figure 4:
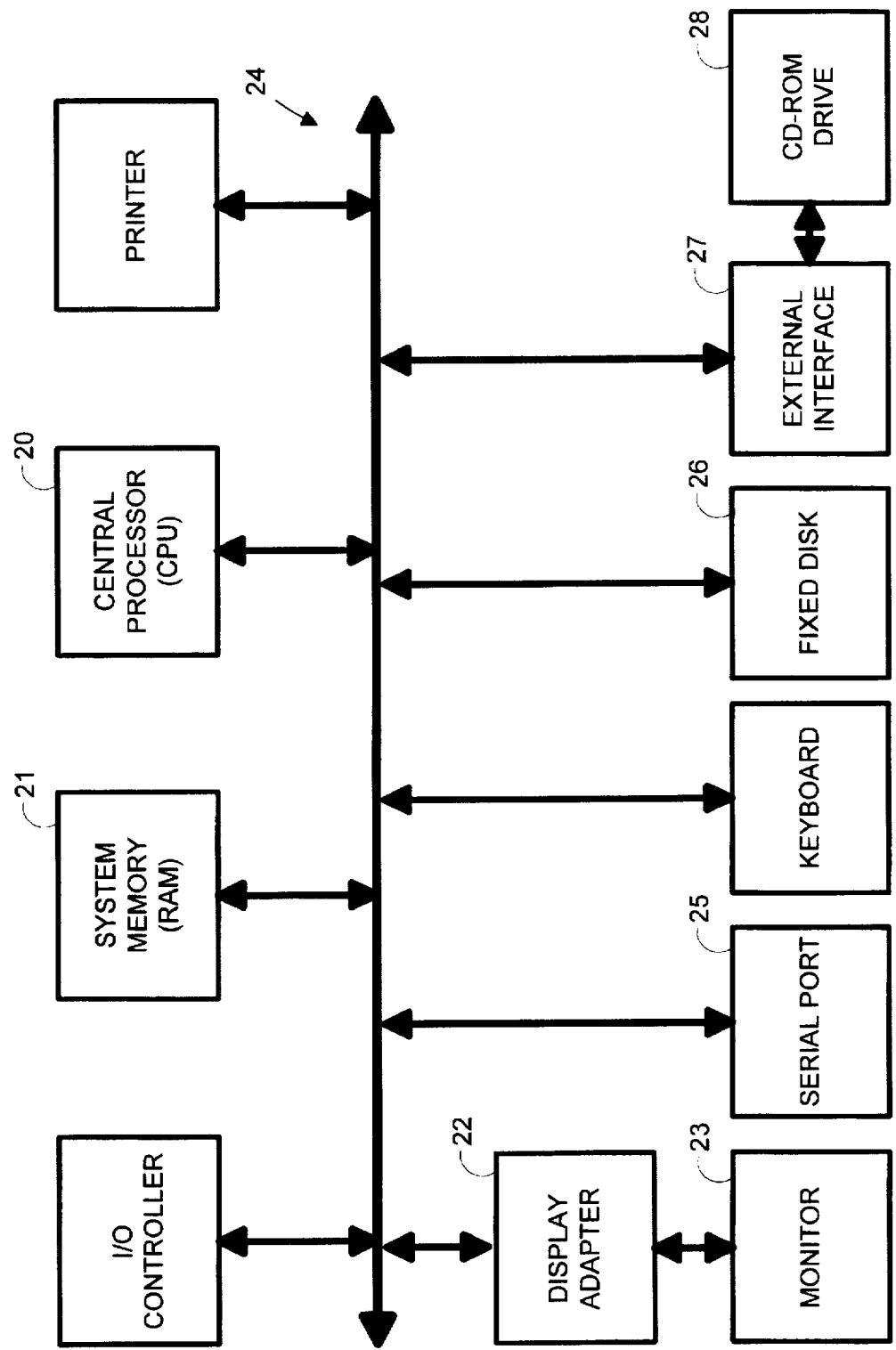
FIG. 4 is an illustration of basic subsystems in the computer system of FIG. 3.

FIG. 4 is an illustration of basic subsystems in computer system 1 of FIG. 3. In FIG. 4, subsystems are represented by blocks such as central processor 20, system memory 21, display adapter 22, monitor 23, etc. The subsystems are interconnected via a system bus 24. Additional subsystems such as a printer, keyboard, fixed disk and others are shown.

Peripherals and I/O devices can be connected to the computer system by, for example, serial port 25. For example, serial port 25 can be used to connect the computer system to a modem or mouse input device. External interface 27 connects CD-ROM drive 28 to the bus. The interconnections via system bus 24 allow central processor 20 to communicate with each subsystem and to control the execution of instructions from system memory 21 or fixed disk 26, and the exchange of information between subsystems. Other arrangements of subsystems and interconnections are possible such as direct memory access (DMA) controllers, co-processing units, etc.

Figure 5:
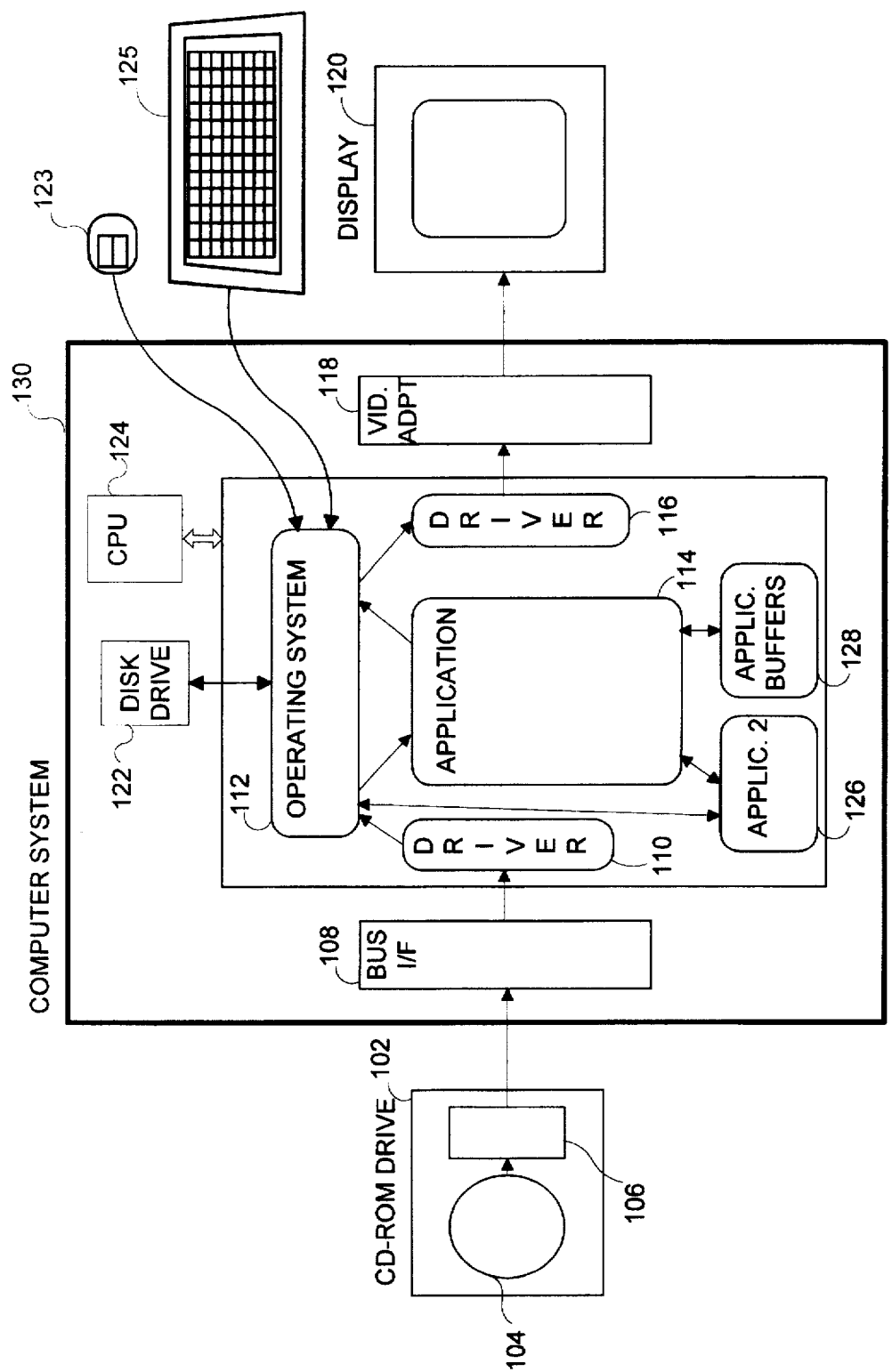
FIG. 5 is a block diagram of a computer system suitable for playing back data according to the present invention.

FIG. 5 is a block diagram of a computer system suitable for playing back video data according to the present invention.

In FIG. 5, system 100 includes the hardware and software through which information from CD-ROM 104 passes before it is displayed on display 120. In general, boxes with square corners in FIG. 5 denote hardware systems or components while boxes with rounded corners denote software programs or processes (also referred to as "software components") executing in a computer system such as computer system 130. The processes reside in RAM 132 and are executed by CPU 124. The general flow of information is shown by lines with arrowheads and proceeds from left to right in FIG. 5. This flow of information from CD-ROM disc 104 to display screen 120 is referred to as a "data path." There are many possible configurations of hardware and software that will differ from that shown in FIG. 5. There are also a variety of data paths within any given configuration. The apparatus and methods of the present invention are adaptable for use at one or more points of any possible data path.

Information is read from CD-ROM 104, by controller 106. Controller 106 may include software and RAM and may, itself, be a computer system. Controller 106 transfers the information to CD-ROM bus interface 108. Bus interface 108 may be one of a variety of bus interfaces such as a small computer systems interface (SCSI) adapter. Bus interface 108 transfers the information onto a bus within computer system 130 (not shown in FIG. 5) so that the data is available to software driver 110.

Driver 110 is usually accessed by operating system 112 to transfer data to application 114. However, some application programs bypass the operating system and access the driver directly. Also, some application programs incorporate their own drivers and may access I/O ports directly without going through an external driver such as driver 110.

Application 114 transfers data between itself and various buffers such as buffers 128. Application program 114 can also communicate with operating system 112 for many purposes such as storing information on disk drive 122, receiving signals from user input devices such as mouse 123 and keyboard 125, etc. other programs or processes, such as process 126, may also be executing in RAM 132 and in communication with application program 114. An example of a process is a so-called "ramdisk" that acts as an auxiliary cache or buffer and may transfer information with application 114. Another example of a process or application is a word processor, spreadsheet program, etc., that need not be in communication with application 114.

Application program 114 will typically access operating system 112 to write data to driver 116 in order to display information via video adapter 118 onto display screen 120. Again, information is transferred between driver 116 and video adapter 118 via a bus not shown in FIG. 5. Usually, CPU 124 is used to accomplish the transfer of information between driver 116 and adapter 118.

As mentioned above, each hardware system in FIG. 5 may include software as part of its operation. Software and hardware boxes may be added to or omitted from the data path shown in FIG. 5. Depending on compatibility versus speed considerations, an application program may not use the operating system to communicate with peripherals such as disk drive 122, CD-ROM drive 102 and display 120. Also, hardware systems may be employed in place of software processes if speed is more important than flexibility. For example, if DMA techniques are used by bus interface 108 then driver 110 is not needed and may be replaced by a buffer area in memory. In this case, a DMA controller is used to place data into the buffer area.

B. Selection of Frames

The present invention uses frame selection methods to discard frames during playback so that only frames of a desired sequence are displayed. These frame selection methods may be implemented in hardware or software at any point in the system of FIG. 5 from controller 106 to video adapter 118. In a preferred embodiment, the frame selection is made under the direction of application program 114. While this sacrifices speed and efficiency it allows the interactive video production to be compatible with standard operating systems such as Microsoft Windows 3.0 by Microsoft, Inc., or the Macintosh operating system by Apple Computer, Inc. A description of these operating systems may be found in Microsoft Windows User's Guide Version 3.0 by Microsoft Corporation, and Macintosh User's Guide, by Apple Computer, Inc. Performing frame selection at the application program level allows the features of the present invention to be transparent to existing computer systems, prevents conflicts among other software that may be executing in the computer system and is in keeping with standard computer hardware and software practices. Further, it allows the present invention to be practiced without modifying existing hardware or software that consumers may already own.

Figures 6A, 6B:
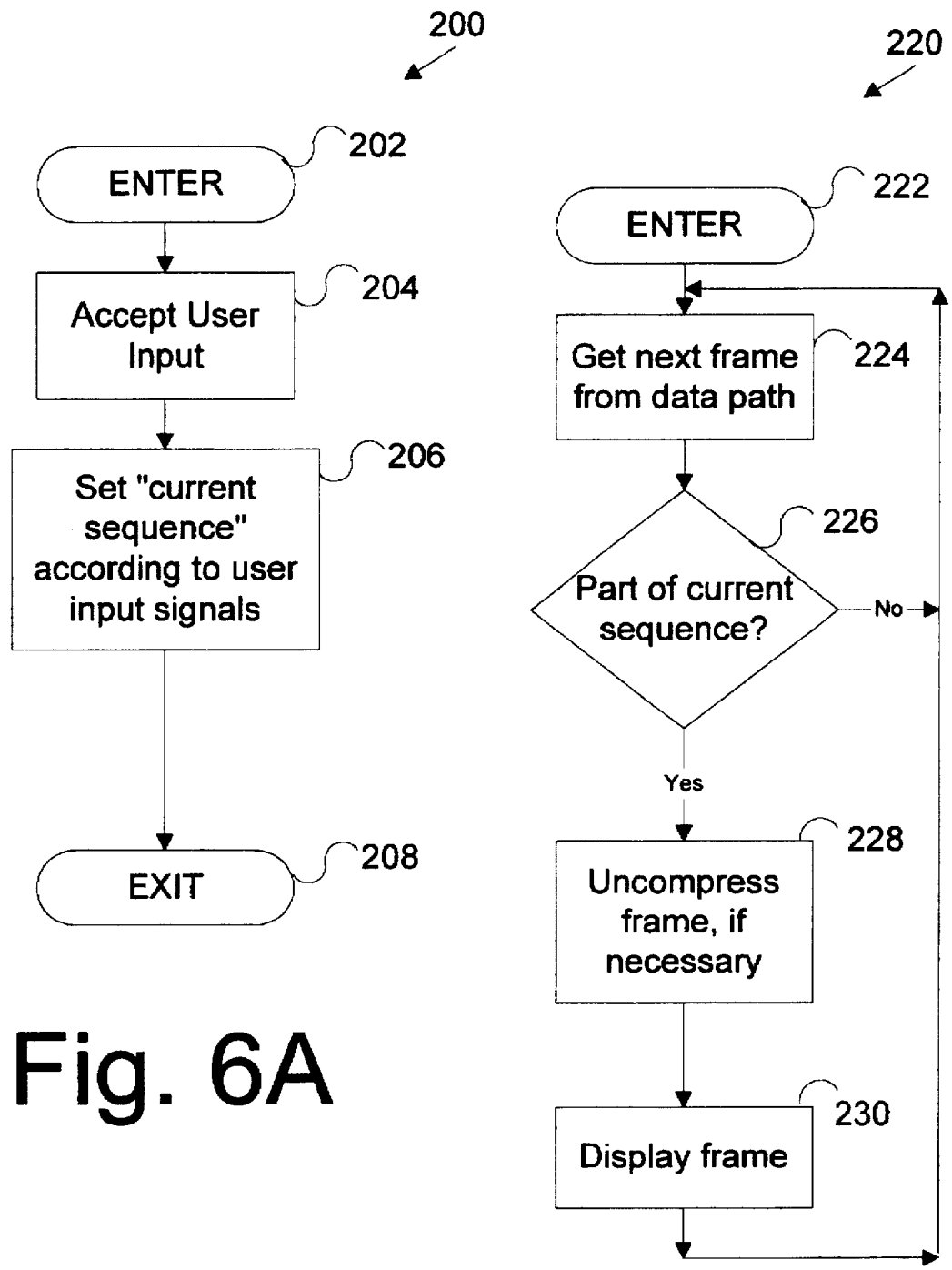
FIG. 6A shows a flowchart for a routine to select the current sequence.
FIG. 6B shows a flowchart for a routine to select and display frames according to the state of the current sequence variable.

FIGS. 6A and 6B show flowcharts of methods of the present invention to select frames from a series of frames read from a CD-ROM.

In general, the flowcharts in this specification illustrate one or more software routines executing in a computer system such as computer system 130 of FIG. 5. The routines may be implemented by any means as is known in the art. For example, any number of computer programming languages, such as "C", Pascal, FORTRAN, assembly language, etc., may be used. Further, various programming approaches such as procedural, object oriented or artificial intelligence techniques may be employed.

The steps of the flowcharts may be implemented by one or more software routines, processes, subroutines, modules, etc. It will be apparent that each flowchart is illustrative of merely the broad logical flow of the method of the present invention and that steps may be added to, or taken away from, the flowcharts without departing from the scope of the invention. Further, the order of execution of steps in the flowcharts may be changed without departing from the scope of the invention. Additional considerations in implementing the method described by the flowchart in software may dictate changes in the selection and order of steps. For example, event handling may be by interrupt driven, polled, or other schemes. A multiprocessing or multitasking environment could allow steps to be executed "concurrently." For ease of discussion the implementation of each flowchart is referred to as if it is implemented in a single "routine".

FIG. 6A shows a flowchart for a routine 200 to select the "current sequence" according to user input. Routine 200 may be implemented by a variety of means as is known in the art, such as by using operating system routines to accept keyboard or mouse signals at predetermined times. The accepted signals are processed to set a variable to one of several states that indicate a current sequence such as sequence_A or sequence_B. In a preferred embodiment, routine 200 is invoked by an interrupt and entered at step 202 when a user input is detected. Routine 200 runs concurrently with the routine of FIG. 6B.

Routine 200 is greatly simplified. At step 204 user input is accepted. At step 206 the user input signals are used to set a variable indicating the current sequence. For example, at a decision point the user has the opportunity to enter a response that selects between two paths, or sequences of images. If the user inputs "yes" at the keyboard the value for sequence A is assigned to the current sequence variable. If the user does not enter "yes" the value for sequence B is assigned to the current sequence variable. After the current sequence has been updated, routine 200 exits at step 212.

FIG. 6B shows a flowchart for a routine 220 to select and display frames according to the state of the current sequence variable as set by routine 200. Routine 220 executes concurrently with routine 200 so that the current sequence is selectable while a sequence is being displayed. Routine 220 is also greatly simplified and may be implemented by a variety of means. A preferred implementation of key steps in routine 220 of FIG. 6B is discussed below.

Routine 220 is entered at step 222 where it is assumed that frame data is being read from a CD-ROM formatted in an interleaved manner as described above. At step 224 the next frame is obtained from the data path. Assuming routine 220 is implemented in an application program such as application program 114 of FIG. 5, the next frame will reside in a buffer such as buffers 128 after having been placed there by other routines in application 114 in concert with operating system 112, driver 110, bus interface 108, etc., as is known in the art. However, certain advantages may be realized by implementing routine 220 at different points in the data path as discussed below.

At step 226 a check is made as to whether the next frame is part of the current sequence as specified by the value of the current sequence variable set by routine 200. If so, execution proceeds to step 228 where the frame data is decompressed, if necessary. Next, the decompressed frame is displayed at step 230 so that the sequence is presented to the user as an animation. Execution returns to step 224 for subsequent frames.

If, at step 226, it is determined that the next frame is not part of the current sequence then execution proceeds back to step 224 where the next frame is obtained for similar checking. In short, only those frames that are part of the current sequence are decompressed and displayed so that only the selected sequence is presented to the user. The association of frames with sequences can be by tags as described above, where frames in a given sequence include an identifying symbol such as the letter A for frames in sequence A. Other methods of association are possible, such as where two sequences are interleaved frame-by-frame so that it is known, once the series starts, that alternating frames belong to the same sequence.

The selection methods of FIGS. 6A and 6B allow an application program to have instant access to different sequences of frames on the CD-ROM disc. Thus, the time to switch between sequence A and sequence B is not limited by the time to mechanically reposition the read head in the CD-ROM drive and is instantaneous insofar as the frame rate is concerned since the first frame of a different path is displayed immediately after the current frame of the current path. Depending on the refresh rate of frames on the display, the transfer rate of data from the CD-ROM, the frame size and the compression and decompression schemes, any number of sequences may be interleaved and instantly selected during the playback of an interactive video while still maintaining visual continuity at high refresh rates of, e.g., 24 fps, 30 fps or more.

Where the method of FIGS. 6A and 6B is implemented at the application level in, for example, application 114 of FIG. 5, each frame from the CD-ROM will most likely have to be read into a buffer such as buffers 128. In other words, even frames that will be dropped must be transferred from the CD-ROM disc to buffers in RAM. This is not a huge drawback since the CD-ROM drive and data path are designed to operate optimally in transferring continuous data to buffers. In a preferred embodiment the frames are also compressed. This means that dropped frames only impact the data transfer one twenty-fifth (assuming 25:1 compression) as much as they would have assuming no compression.

Much of the following discussion deals with "frame refresh intervals," or "intervals". An interval is merely the time between successive displaying of frames on the display screen and is used for convenience since, where the interval is fixed, describing the timing for an interval accurately describes the timing of the entire interactive production.

In a preferred embodiment the application program can make an instant decision on whether or not to decompress and display a frame that is only partially loaded into a buffer if the tag or ID number is placed at the beginning of frame data. For frames not part of the current sequence the application program, at step 226 of FIG. 6B, reads the tag from the first few bytes of the buffer and knows that the frame is not to be displayed. The application program is then free to do further processing while the ignored frame finishes being loaded into the buffer and the next frame in the selected sequence completes loading into the buffer. Other ways to optimize the execution of the application program and the selecting and dropping of frames at the application program level are possible.

The method of FIGS. 6A and 6B may also be implemented in various other stages of the data path. For example, if the method is implemented in bus interface 108 it is possible to prevent frames that would otherwise be dropped from being loaded into RAM. This frees up bus time and wasted processing time in executing driver 110 and operating system 112 instructions. However, the drawback is that this requires a modification to the bus interface card unlike the software-only solution described above where the method is implemented by an application program.

Similar design tradeoffs are seen depending on where the method is implemented in the data path. For example, if the method is implemented in controller 106 the highest degree of efficiency is achieved since unused frames are dropped immediately and the rest of the data path sees only frames that are part of the current sequence and, therefore, will be displayed. This requires customizing the CD-ROM drive, however, and requires communicating parameters, such as the current sequence variable, from the application program to controller 106. The method could also be implemented in operating system 112, but this requires changing the operating system standard.

Other distinct advantages of the present invention are achieved where caching is used in the data path. In the example system of FIG. 5, look-ahead caching is typically used at several points.

Controller 106 typically includes a small cache to account for fluctuations in data transfer in reading CD-ROM 104. Caches also are usually present at bus interface 108, operating system 112 and application 114. Other caches could exist where the user's system includes, e.g., a ramdisk such as at application 126, or operating system caching to a hard disk such as disk drive 122. Additionally, CPU 124 typically implements on-chip caching. Other caches may exist at various points in the system such as within disk drive 122, itself.

The present invention makes optimal use of look-ahead caching wherever it's used since the data is always read from the CD-ROM sequentially. Thus, the transfer rate for information in the data path is at its maximum rate allowed by the various hardware and software components in the data path. The method of the present invention may be applied to the caches themselves by treating the caches as if they are buffers such as buffers 128 discussed in the above example. In other words, frame data is placed into a cache and a determination is made whether the frame is part of the current sequence. If not, the frame is dropped by purging the cache or merely reusing the data area of the cache occupied by the frame to store a subsequent frame.

Many specific implementations of the method of FIGS. 6A and 6B are possible. For example, at the application level buffers can be used to contain the frames. The buffers may be updated with frames by a write routine while a read routine selects the proper frames for display and "passes over" or drops frames not in the selected current sequence. Such an implementation is described in detail in the next section of this specification.

The present invention has certain advantages when an interactive production is delivered to multiple users over a transmission channel as opposed to a CD-ROM drive. To illustrate this, the CD-ROM drive in FIG. 5 may simply be replaced by a transmission channel such as a wire cable, fiber optic link, electromagnetic broadcast, etc. Frames may then be transmitted over the channel in an interleaved pattern at a constant data rate.

The advantage of using the present system when data is sent over a transmission channel is that the data may be broadcast to multiple users at the same time without compromising the interactivity of the production, increasing the complexity of processing or increasing the bandwidth required to achieve interactivity. The data can be sent in real time, much like a standard television broadcast, while the user interacts with the transmitted frames by selecting the current sequence from the multiple sequences in the interleaved frames. This differs from other schemes providing interactivity where multiple channels are used for multiple users and there is no requirement to keep multiple channels synchronized to each other.

C. An Application Level Selection Implementation

Next, FIGS. 11, 12 and 13A–C are discussed to describe an implementation of the present method using buffers at the application level.

Figure 11:
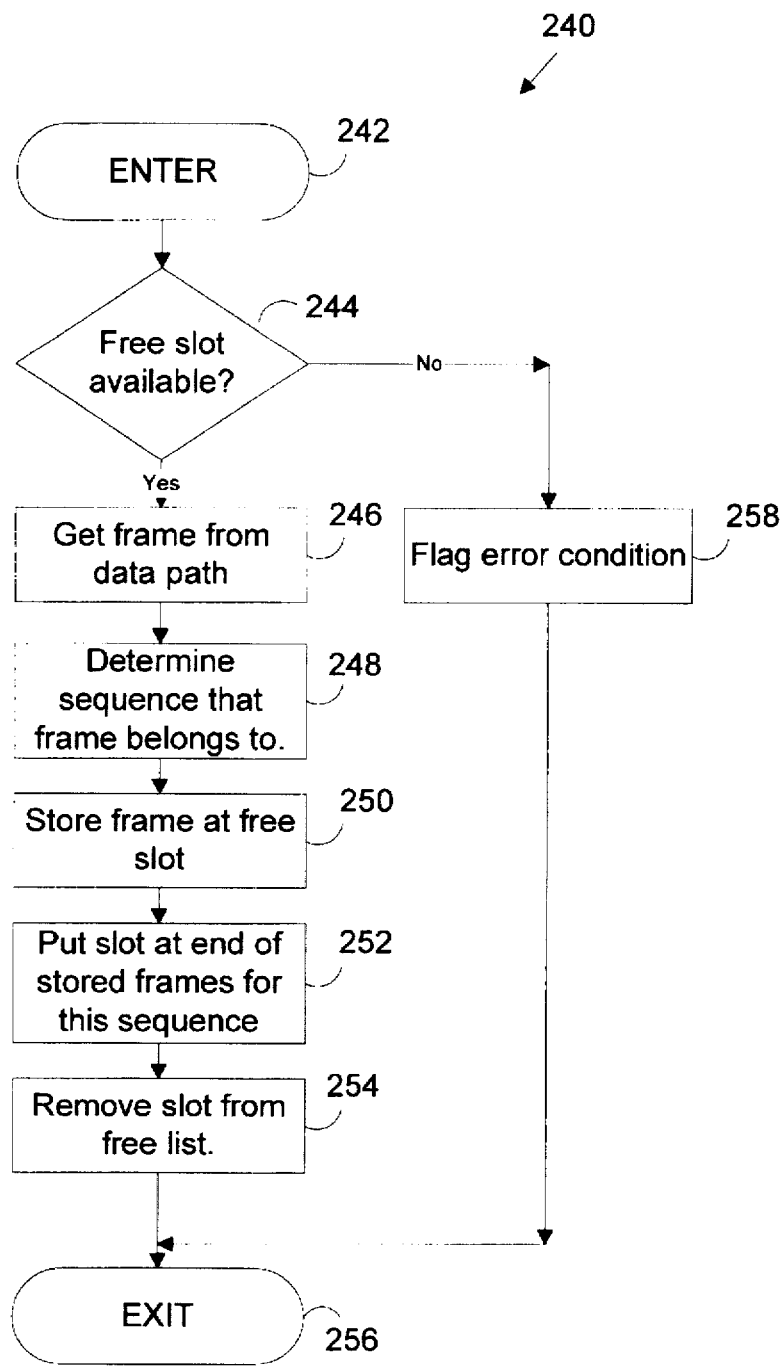
FIG. 11 is a flowchart of a routine that obtains frames from the data path and stores the frames to a buffer.
Figure 13A:
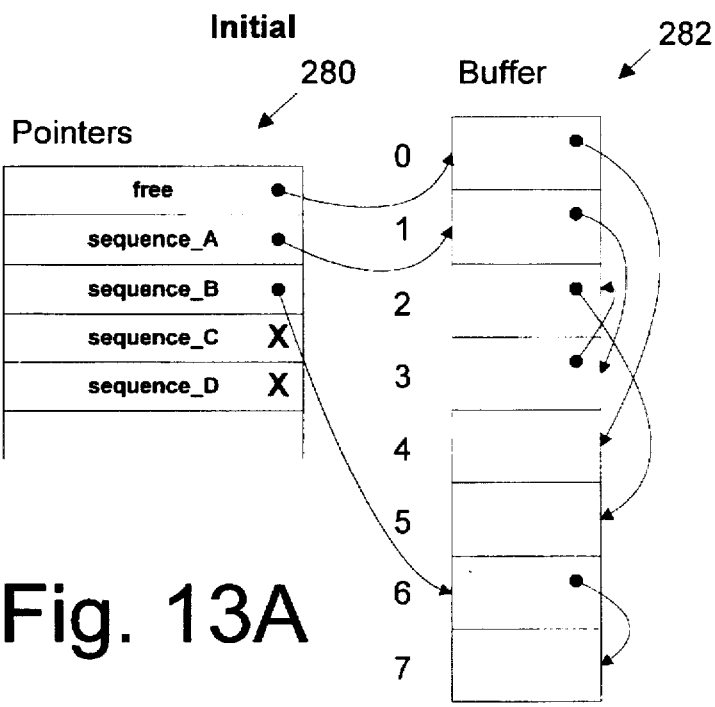
FIG. 13A is a first diagram of data structures.

FIG. 11 is a flowchart of a routine 240 that obtains frames from the data path and stores the frames to a buffer. Routine 240 operates on data structures such as those shown in FIGS. 13A–C. In FIG. 13A pointers at 280 each point to a slot in buffer 282. Each slot in buffer 282 is large enough to contain a frame of data along with any associated information such as the frame tag and codec information. Buffer 282 has 8 slots numbered 0–7. The buffer size may be larger or smaller depending on the demands of the system and the interactivity requirements as discussed below. The number of pointers used may vary. Additional pointers are shown in FIG. 13A such as sequence_C and sequence_D pointers which do not have any list of slots associated with them. Therefore, these sequences are not available for the user to select during playback of the interactive production. However, they may become available at a later time when frames designated for these sequences are obtained from the data path and placed into the buffer.

Pointers 280 each point to the beginning of a linked list of slots although the list pointed to by a pointer may be empty, or null. Each slot in a given list includes a pointer to the next slot in the list. Thus, the slots in a list may be in arbitrary order with respect to the slot numbering. This is a so-called "singly" linked list. Refinements on this approach, such as by using back pointers between slots in the list to create a "doubly" linked list, and "tail pointers" to show the end of a list may be used. Many modifications to the present buffering scheme are possible. Also, many different ways of implementing the system of the present invention are possible, the use of buffers as described here being but one possible way.

Routine 240 of FIG. 11 is entered at step 242. Routine 240 is called often enough to obtain each frame from the data path without missing frames as they are read off of the CD-ROM disc at a more or less constant rate. At step 244 a check is made as to whether there is a free slot available in the buffer. Using the pointer scheme shown in FIG. 13A this merely requires looking at the pointer called "free" to see whether it points to a slot or not. If no slot is available, an error condition is flagged at step 258 and routine 240 exits at 256.

With the pointer values as shown in FIG. 13A, slots 0 and 4 are on the free list. In other words there are two free slots so execution proceeds from step 244 to step 246 in routine 240 of FIG. 11. At step 246 a frame is obtained from the data path. Obtaining a frame is dependent on the components used in the data path. One way to obtain a frame is to copy the frame from an auxiliary buffer used by operating system routines (or other hardware and software) after the routines have transferred the data from the CD-ROM. Alternatively, some systems allow a pointer to an area of memory, such as slot 0 of buffer 282, to be passed to hardware or software components whereupon the area of memory is filled with the data from the data path, e.g., by DMA transfer or by other means. In the latter case, the steps of flowchart 11 need to be modified in order to reflect the automatic placement of data into the buffer.

Figure 13B:
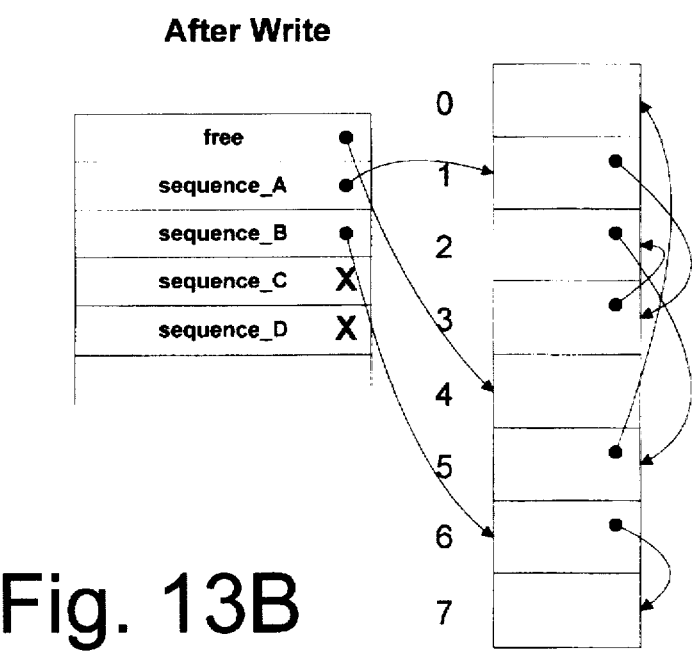
FIG. 13B is a second diagram of data structures.

Assuming that the frame data must be copied from an auxiliary buffer, routine 240 of FIG. 11 executes step 248 to determine the animation sequence that the frame belongs to. In a preferred embodiment this is done by examining a tag or other identification associated with the obtained frame. At step 250 the frame is stored into a free slot. In the present example the first slot in the free list, slot 0, is used. Next, step 252 is executed in routine 240 so that slot 0 is added to the list for its associated sequence. Assuming the obtained frame belongs to sequence A, FIG. 13B shows the obtained frame added to the sequence_A list so that the list of slots is now 1, 3, 2, 5, 0. Step 254 in routine 240 removes slot 0 from the free list so that the free list now contains only slot 4. Finally, routine 240 of FIG. 11 is exited at step 256.

Figure 12:
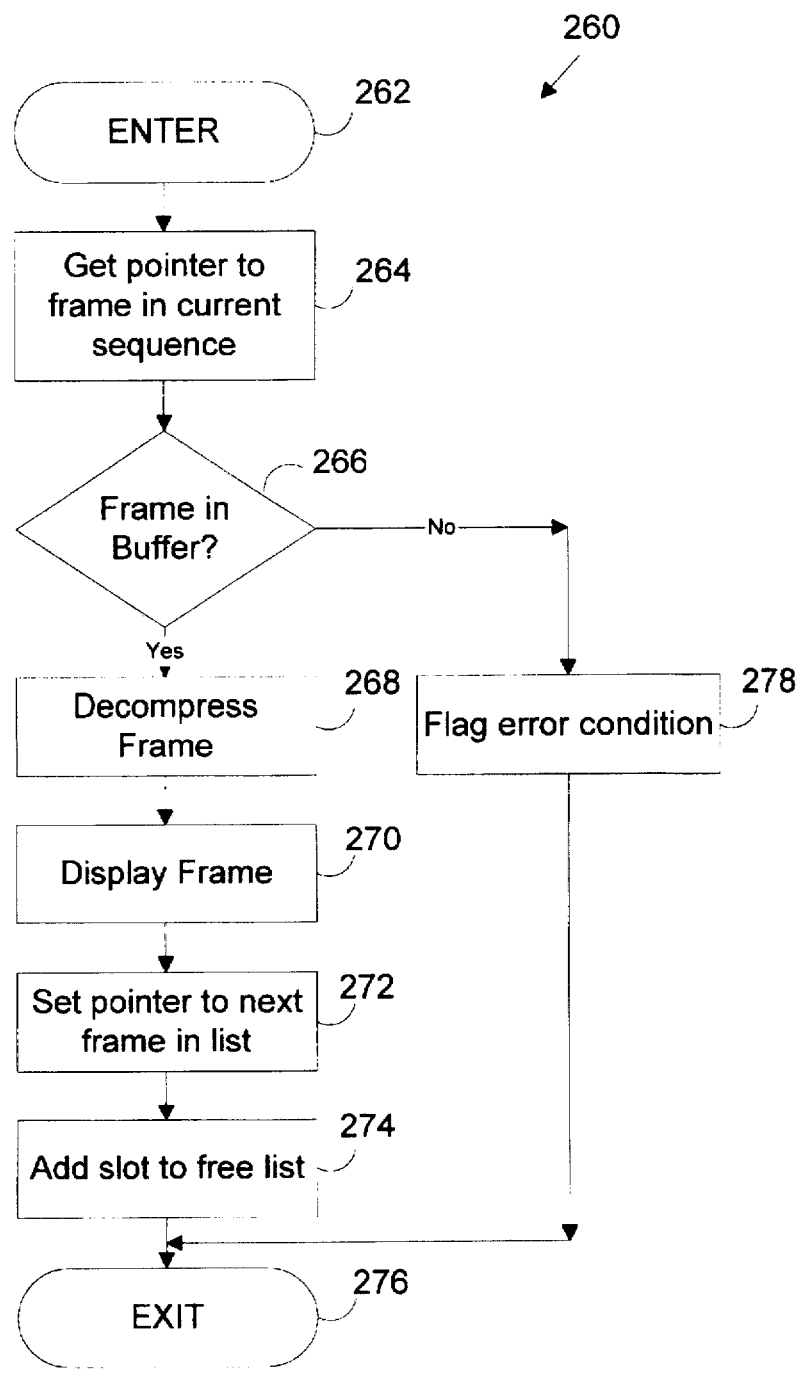
FIG. 12 shows a routine for retrieving and displaying a frame from a buffer.

FIG. 12 shows a routine 260 for retrieving and displaying a frame from the buffer. In FIG. 12, routine 260 is entered at 262. Routine 260 is typically called after each frame refresh interval at a fixed frame rate where interactive video is used. However, routine 260 need only be called often enough to present smooth information to a user of the interactive production and the frame rate may be of varying rates in different productions and even within a given production.

At step 264 routine 260 checks the pointer for the list of slots of frames that corresponds to the current sequence. In the present example sequence A is the current sequence (as indicated by a current sequence variable, discussed above) so pointer sequence_A in FIG. 13B is checked. Step 266 determines whether or not the list pointed to by sequence_A is empty. If the list is empty then step 278 is executed which flags an error condition and the routine is exited. At this point in time, pointer sequence_A points to a list of slots 1, 3, 2, 5, 0 so step 268 is executed to decompress the next frame in the list, namely, the frame in slot 1.

Figure 13C:
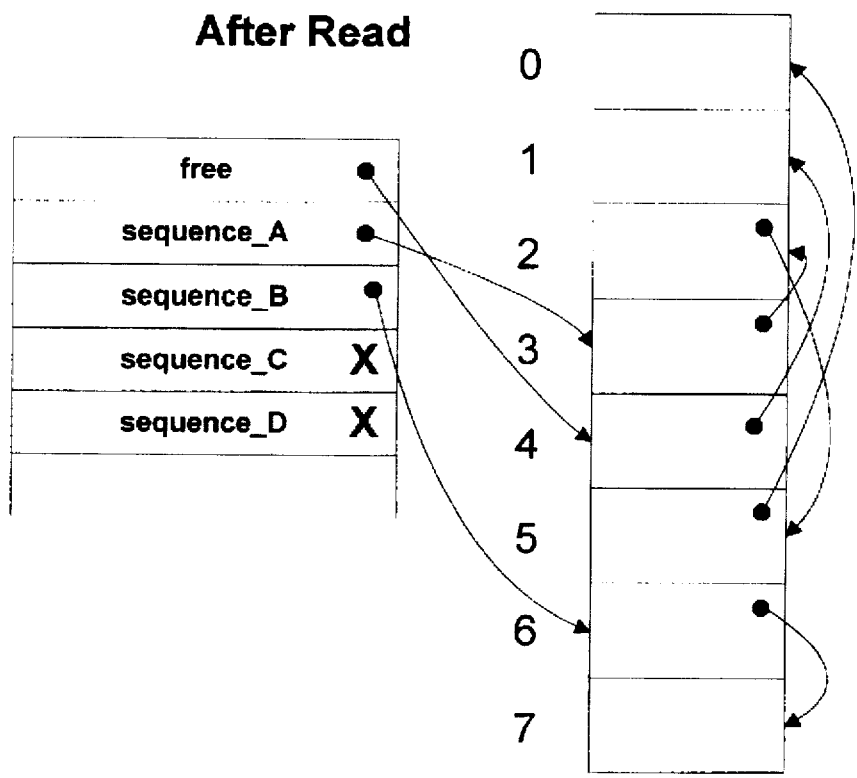
FIG. 13C is a third diagram of data structures.

After the frame in slot 1 is decompressed the frame information is displayed on the display screen at step 270. At step 272 the pointer sequence_A is set to point to the next frame in the list. Step 274 adds slot 1 to the free list so that it may be reused. At this point, the pointer and buffer arrangement is as shown in FIG. 13C.

Thus, the description above illustrates how frames from the data path are written to a buffer and read from the buffer and displayed.

A deficiency exists in the system described so far since, in a preferred embodiment, one frame per refresh interval is being displayed to the user while multiple frames are being read from the CD-ROM disc and stored to the buffer in any given frame refresh interval. This means that the buffer will quickly fill up.

Figure 14:
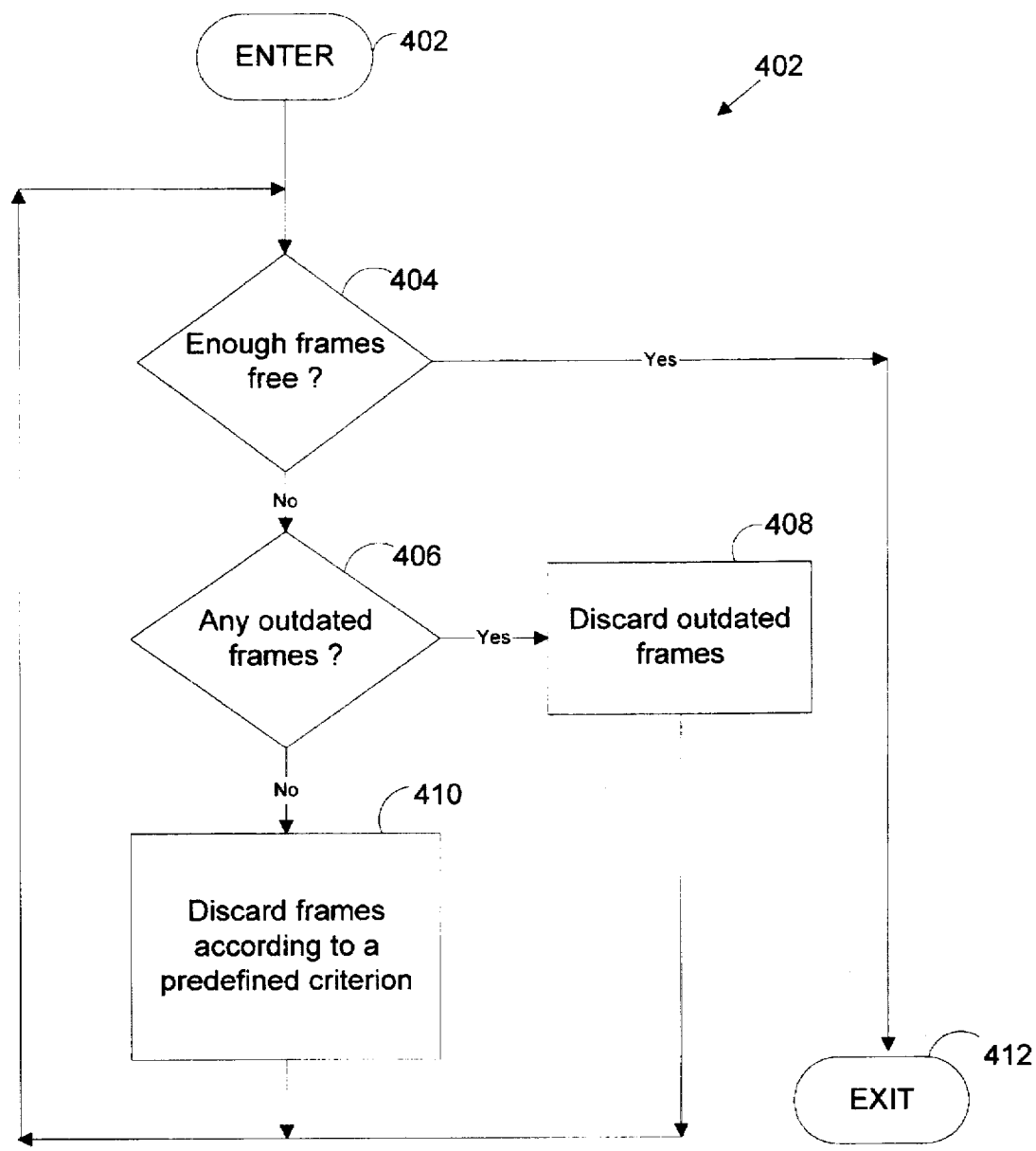
FIG. 14 shows a routine for clearing a frame buffer.

FIG. 14 shows a routine 400 for clearing the buffer based on outdated frames or some other criterion. Routine 400 is entered at step 402 and is called frequently enough, e.g., once every refresh interval, to remove unneeded frames from the buffer. At step 404 a check is made as to whether there are enough free slots in the buffer. If so, the routine is exited at step 412. It is desirable to keep as many frames in the buffer as possible since this is more efficient use of buffer space and since there may be some use for frames, even outdated frames, by an application program.

At step 406 a check is made as to whether any outdated frames are in the buffer. Outdated frames are detected by including a frame number with each frame within the frame's tag. Frames from any sequence that have passed their opportunity for display will be discarded from the buffer by removing the frame from the list and adding the frame's slot to the free list. The discarding step is performed at step 408 of FIG. 14. Should none of the frames be outdated then a frame is discarded from the buffer according to some other criterion at step 410. For example, one criterion is to discard a frame that it is known will not be used because, e.g., the sequence has become unselectable at some time after the sequence frames were stored into the buffer. Other criterion are possible to free up a slot. For example, a slot may simply be discarded even though the need for the slot's frame at some later time may produce a "dropout" on the display.

In general, the design of a buffering scheme for frames at the application level is affected by many factors. In an ideal system, the frames are provided by the data path in perfect synchronization with the refresh rate so that no buffering is necessary. However, because of errors in hardware such as misreadings from the CD-ROM drive, sharing of resources such as waiting for a system bus to transfer data, limitations on the system such as having a single CPU executing several processes, etc., a buffer is necessary to account for fluctuations in the frame delivery rate of a data path. Also, buffering provides the ability for an interactive production to access multiple frames at any given frame interval to facilitate performing some of the operations discussed below in connection with interleaving techniques.

III. Interleaving Techniques

Next, different patterns of interleaved frames that greatly improve interactivity are discussed. Specific patterns that implement the following modes of interactivity are presented: Simple path switching, time stepped path switching, single branch point transitions and multi-branch point transitions.

A. Simple Path Switching

Figure 7:
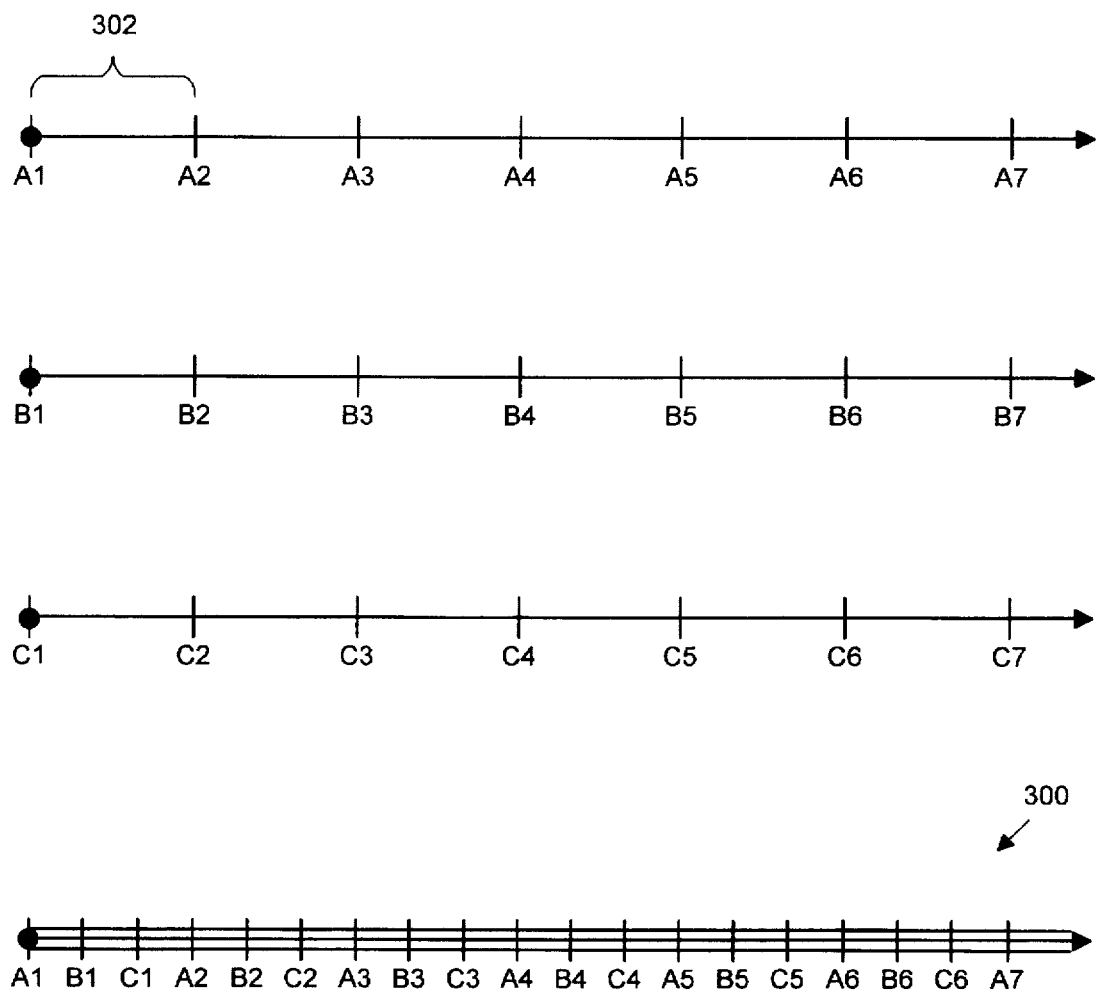
FIG. 7 shows timelines used to illustrate simple path switching.

FIG. 7 shows three timelines corresponding to three different sequences of animation. The topmost timeline shows a sequence A that includes frames A1–A7. Only a portion of the timeline is shown since it continues off to the right. The display of each frame in sequence A is indicated along the timeline as a tic mark above each frame label. The interval 302 for displaying each frame depends upon the frame refresh rate. A typical rate is 30 fps for video or 24 fps for film. However, in contemporary computer productions this rate may vary. For ease of discussion we assume a constant desired frame rate of 30 fps. This means that the frame interval is 1/30th of a second. Thus, each frame is displayed on the display screen for about 1/30th of a second.

Timelines for sequence B and sequence C are similarly shown. Since sequence B and sequence C are also assumed to have frame rates of 30 fps, the tic marks for sequence B and C line up with the marks for sequence A.

CD-ROM track 300 is shown at the bottom of FIG. 7. CD-ROM track has all of the frames shown for sequences A, B and C on its single track in the interleaved fashion described above. CD-ROM track 300 is not a timeline but is a one-dimensional (or nearly so) spatial arrangement of frames from the sequences shown linearly in FIG. 7. In a preferred embodiment, track 300 plays back so that the frame rate of the data transfer from the CD-ROM drive to an application program is three times the 30 fps rate, or 90 fps. This can be achieved by a combination of codec schemes and drive transfer rate. Currently available codec schemes allow a 30 fps rate on a single speed CD-ROM drive. This means that triple speed CD-ROM drives now available will provide 90 fps, or three separate frame sequences when the system of the present invention is used. The number of allowable frame sequences will increase as drive speeds increase and codec schemes improve.

An interactive video production with an interleaved track as shown in FIG. 7 allows a user to instantly switch between any of the three sequences A, B and C. This is useful, for example, where each sequence focuses on a different character in a plot and the characters are in different locations. The user is able to select which character to observe. Note that the user is able to make the selection at any point in time so that, as opposed to traditional interactive video productions, the user is provided with unlimited interactivity insofar as observing different characters, moving to different locations, etc., is concerned. The switching between sequences occurs instantaneously. In other words, the frame rate of 30 fps is uninterrupted regardless of how much switching between sequences occurs. In a preferred embodiment, a short visual transition or "segue" is used so that a signal indicating the switch in sequences is provided to the user.

One problem with the simple path switching of FIG. 7 is that some codec schemes rely heavily on frame to frame similarities within a sequence in order to achieve good compression. When a frame's decompression uses data from a different frame it is called inter-frame compression as opposed to intra-frame compression which only uses the information within a given frame to compress and decompress the frame. Inter-frame compression has advantages in animation sequences since there are usually many similarities from one scene to the next if only part of the images in the scene are moving. However, in an interactive video production where the user is given the ability to switch randomly between different sequences the inter-frame compression scheme will suffer from inefficiencies.

To illustrate this, assume that frames A4 and A5 have been compressed using MPEG inter frame compression. This means that frame A5 will have decompression information associated with it that depends on the information from frame A4. However, if frame A5 is branched to from sequence B or C then A4 will never have been processed by the playback computer system so that decompression of frame A5 is impossible. Indeed, frame A4 may be compressed according to frame A3 and so on.

Fortunately, the MPEG codec scheme provides that intra-frame compression occurs quite regularly and relatively frequently compared to human response times. An intra-frame compression occurs about once every 0.4 seconds (assuming 30 fps). This translates to one of every 12 frames in a sequence being compressed purely based on information within the single frame. Once a user selects a branch to a different sequence, the playback system need only wait up to a maximum of 0.4 seconds until the next frame in the different sequence with intra-frame compression comes up in order to make the transition. This delay can be reduced with different codec schemes. Even with the 0.4 second delay there is an improvement over the 0.3 or greater average time to access information using traditional CD-ROM access methods. In practice, the access time in traditional CD-ROM drives is at its worst in interactive video productions since the long video sequences mean that the access time will almost always be close to its worst, at about 0.5 to 1 second for some drives.

For example, if frames A2–A6 are compressed using inter-frame compression and frames A1 and A7 are compressed using intra-frame compression then, should a user decide to transition from sequence B to sequence A just after frame B1 has been displayed, the playback system need only wait until frame A7 is available from the data path. This is a delay of only about 6/30ths of a second. This delay will be reduced if the data transfer rate from the CD-ROM is increased. In the present example, if the data transfer rate is doubled, that is, if 180 fps can be transferred from the CD-ROM either through improved transfer speed or codec schemes, then the worst-case delay will be halved to about 1/10 second.

Alternatively, the last twelve frames of every sequence could be kept in a buffer so that inter-frame decompression could always be carried out, although the time to compute decompression for twelve frames may be lengthy. Other solutions are to use only intra-frame compression techniques or to decompress all sequences on the fly, even those sequences not being used.

B. Time Stepped Path Switching

Time stepped path switching creates a problem in switching between different sequences when there are one or more same events that are present within two or more sequences.

For example, in an interactive production where the user is able to be present in different rooms in a house in order to observe different characters there could be a ringing doorbell that is heard throughout the rooms. A second event could be someone announcing over an intercom system that they will get the door. However, if these sequences are originally filmed or taped with live actors in real time (as opposed to computer generated characters) then it is unlikely that the spacing of the two events will occur in the same number of frames in each of the sequences. In other words, it is likely that there will be a difference in the two events of greater than 1/30 second. This could result in the user hearing a partial repeat of the announcement over the intercom should the user switch from a first sequence to a second sequence where the announcement came a fraction of a second later in the second sequence. While such a discrepancy could conceivably be corrected by shifting the audio track within the sequences, it may arise that characters or objects on the screen are affected in accordance with the sound events. For example, the announcement may be heard in the first sequence and then the user may switch to the room where the person making the announcement is seen speaking into the intercom. Other visual events could occur that need to be coordinated among the different sequences such as a flash of lightning that's visible in multiple rooms.

One approach to correct this is to use time stepped path switching patterns. This is a way to compensate for differences in the number of frames between two same events on different sequences. Time stepped path switching requires a faster data transfer rate than simple switching to allow for one or more sequences to "catch up" with other sequences.

Figure 8:
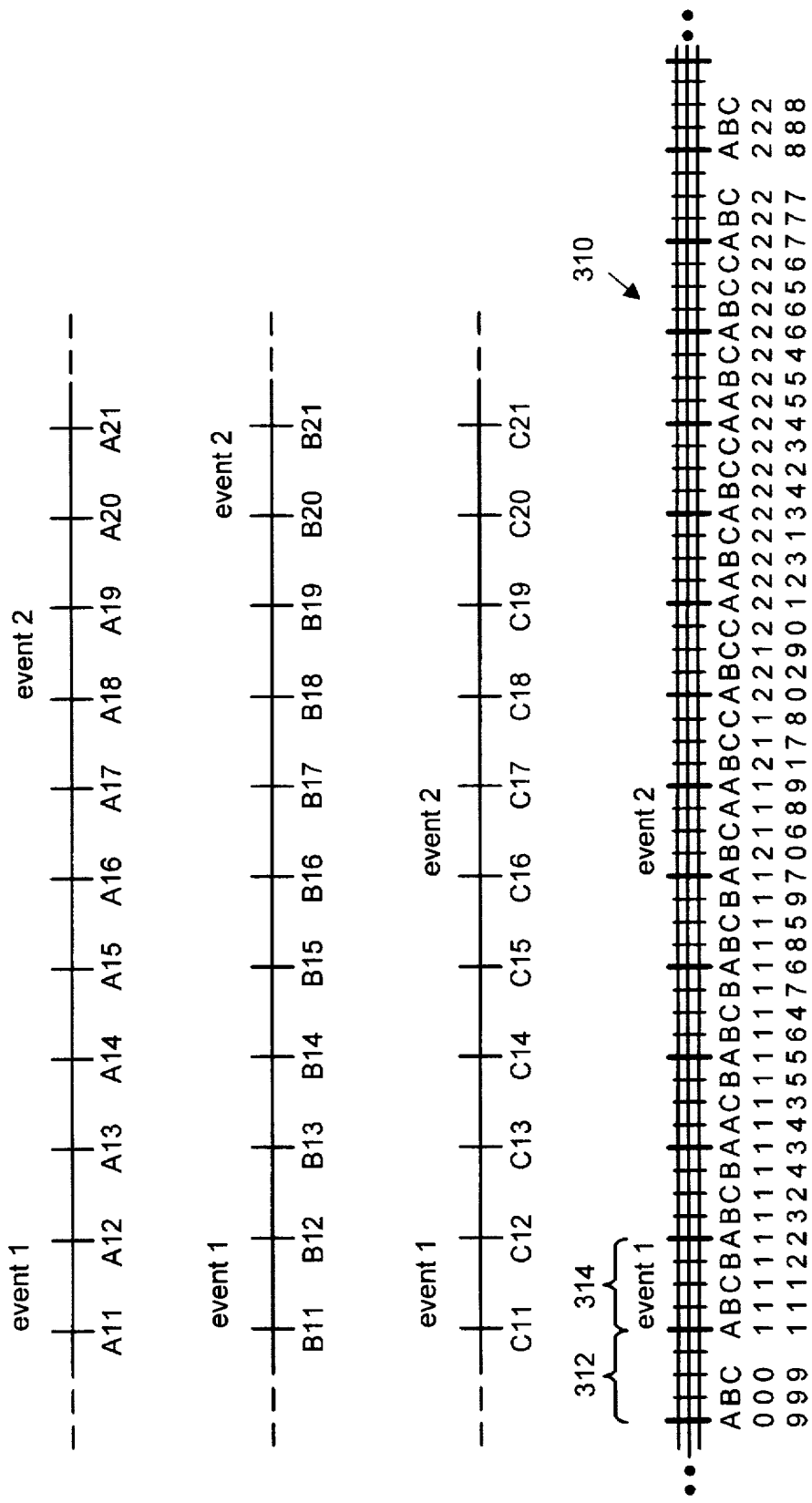
FIG. 8 shows timelines used to illustrate time stepped path switching.

FIG. 8 shows three timelines similar to those of FIG. 7. In FIG. 8, the timeline for sequence A has a first event, event 1, occurring at frame A11. Event 2 occurs at frame A18. In sequence B, event 1 occurs at frame B11 but event 2 occurs at frame B20. Thus, there is a two frame difference in the interval of the events in sequence B from sequence A. This small discrepancy is used here for ease of discussion. In practice much larger discrepancies can be handled by the system described here as will be apparent to one of ordinary skill in the art.

In sequence C, there are only 6 frames between the occurrences of events 1 and 2.

CD-ROM track 310 is shown at the bottom of FIG. 8. At interval 312 frames A9, B9 and C9 are stored, similarly to the format of FIG. 7. However, the bandwidth, or transfer rate, of track 310 is greater than that of FIG. 7 to allow at least one more frame per interval to be stored. Thus, the transfer rate of the playback of track 310 is at least 120 fps although the instant rate for interval 312 is only 90 fps since only three frames are stored in the interval.

At interval 314 event 1 has occurred. At interval 314 special use is made of the ability to store an extra frame by having frame B12 stored in the interval along with frames A11, B11 and C11. It can be seen that extra frames from sequence B are stored in four intervals of track 310 between events 1 and 2. This accounts for the greater number of frames in sequence B between the two events. Thus, frame B20 is available for playback at the position of event 2 on track 310. Similarly, for sequence A there are additional frames inserted so that, at event 2, frame A18 is available.

The requirement for increased bandwidth is calculated as the number of extra frames from all sequences (besides the shortest one) between the two events divided by the number of frames in the shortest sequence between the two events. This yields the number of extra frames per interval that must be stored. In the present example the calculation is (2+4)/6=1. This is in accordance with the ability to store an extra frame per interval in track 310 when time stepped path switching is performed.

One problem with time stepped path switching is that a large number of frames may have to be buffered. Where frames for a given sequence are being transferred from the CD-ROM at faster than the display frame rate the additional frames must be held in a buffer until they can be used. Each time two frames from sequence B are obtained in an interval one of the frames must be stored. This, of course, assumes that sequence B is currently selected and is being displayed. Otherwise, the additional sequence B frames, indeed all sequence B frames, may simply be dropped according to the system described above. For short discrepancies between sequences this is not a problem. The current example, only requires that two frames from sequence B be buffered. However, where the discrepancy is two seconds, this method requires that 30 frames be buffered somehow. One possibility is to spool the buffered frames to a hard disk but this depends on disk storage availability. Another solution is to insure that such large discrepancies don't exist in the sequences when the sequences are filmed.

Once event 2 has been reached on track 310 it may be necessary to re-synchronize the three sequences. This can be done in a similar manner to the discussion above except that it is sequence C's along with sequence A's frames that are "doubled up" in an interval to catch up to sequence B's frame numbers. This is shown on track 310 subsequent to event 2. Again, buffering is necessary where multiple frames from a displayed sequence are available within a given interval. The three sequences are synchronized again at interval 314 and only three frames per interval need be stored thereafter.

The method presented in FIG. 8 is a general way to time shift two sequences with respect to each other. This may be useful for a variety of purposes in interactive productions. The additional frame capacity can be used for other purposes when not used for time stepped path switching patterns.

C. Single Point Transitions

Figure 9:
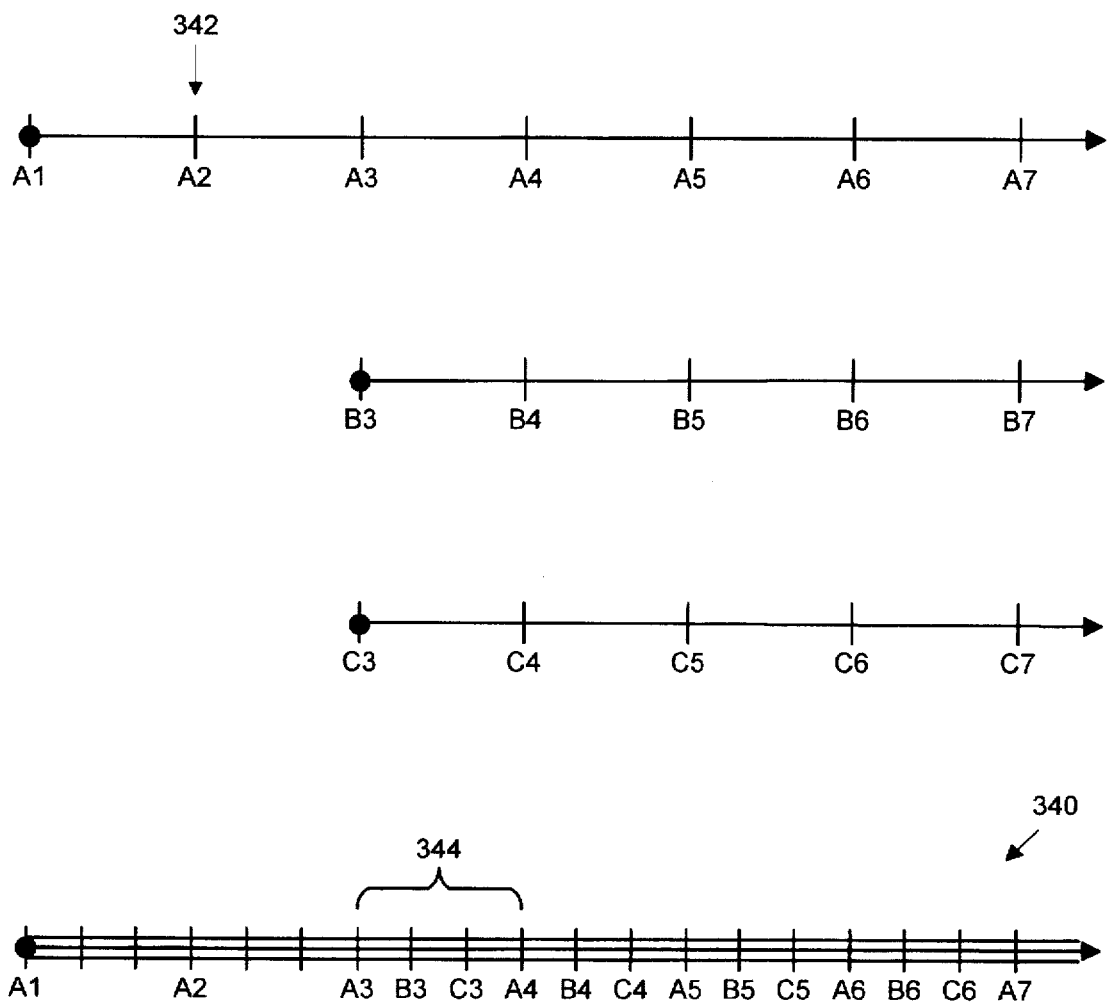
FIG. 9 shows timelines used to illustrate a single point transition.

A single point transition is shown in FIG. 9. A single point transition is similar to the simple path switching pattern of FIG. 7 except that multiple sequence data does not appear on track 340 until the decision point at 342, or frame A2, is reached. As before, track 340 represents a track on the CD-ROM that is played back at a transfer rate that allows multiple frames to be available during an interval corresponding to the interval used to display a frame from the current sequence on the display screen. The transfer rate does not have to be a multiple of the frame display rate. In a preferred embodiment, the data transfer rate allows three frames to be obtained within each interval. For convenience, each frame from sequence A is the start of what is referred to as an "interval" on track 340. Such as interval 344 at frame A3.

At decision point 342, the user is able to affect the interactive video by causing either of sequences B or C to be played. An example of a single point transition is where a character can perform one of two or more actions such as continuing to type a patent at a word processor, smashing the keyboard of the word processor or getting up and going home. In the example, the action of continuing to type is sequence A. The action of smashing the keyboard is sequence B and the action of getting up and going home is sequence C.

Though these actions are all very different, they start from a single common frame at A2. That is, frame A2 is the starting point for each of the three sequences beginning with A3, B3 and C3. Frame A2 could show, for example, the character sitting down and typing at a keyboard. Frames A3 onward in sequence A would continue to show the character sitting down and typing. Frame B3 would show the character beginning to clench his or her fists and subsequent frames in sequence B would show the fists being raised and then lowered violently into the keyboard. Similarly, frame C3 would be a first frame where the hands are coming to rest as the character rises.

Since each of the sequences branches from frame A2 the inter-frame compression problem of the simple path switching pattern discussed above is not a factor with single point transitions (or multi point transitions, discussed below). However, the user is limited in only affecting the interactive video at a specific instant in time. In other words, even if the user decides at some point prior to A3 that the character should get up and go home this effect will not be displayed until frame A3 is reached. In order for the user to believe that they are affecting the video the delay between the user selecting an action and having the action performed should not be more than a small fraction of a second, yet the user should be able to make the selection at any point within a relatively long period of time. Such are the features provided by multi point transitions, discussed next.

D. Multi Point Transitions

Multi point transitions allow a user to make a selection that switches to a different sequence over a relatively long period of time while having the image on the screen respond to the user's selection rapidly. The drawback of multi point transitions is that they require a high bandwidth meaning that a high transfer rate or superior codec scheme must be employed.

Figure 10:
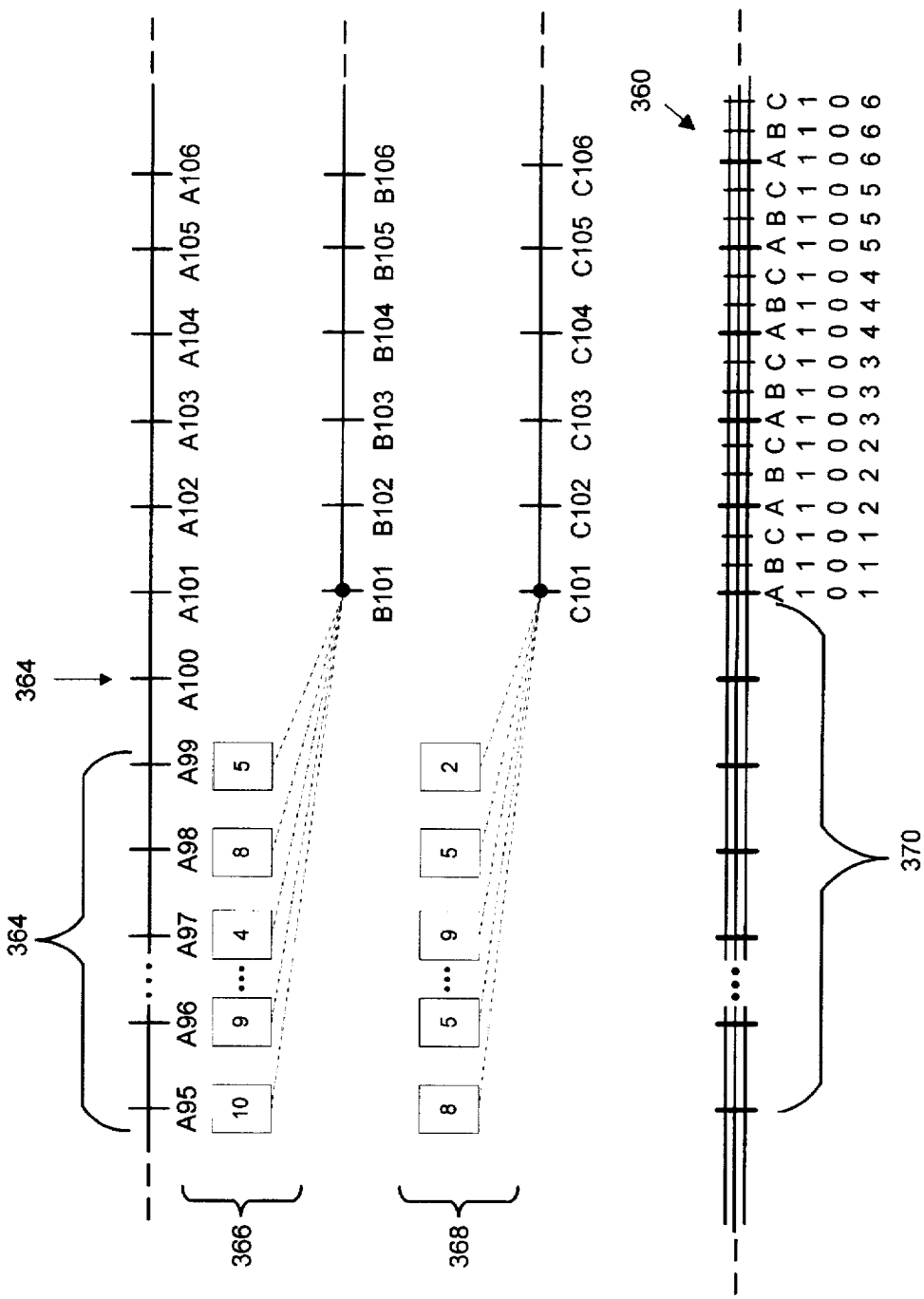
FIG. 10 illustrates multi point transitions.

FIG. 10 illustrates a pattern to implement multi point transitions. In FIG. 10, sequences A, B and C are shown from top to bottom as in FIG. 9. Track 360 is a track on the CD-ROM. The decision point is at 362 where the user's actions determine which of sequences A, B or C will be chosen for subsequent playback as the current sequence. However, FIG. 10 also shows additional transition points at 364. During transition points 364 the user's actions will cause an immediate change in the frames being displayed. The additional transition points are shown in a broken area to indicate that the transition points may extend over an arbitrary length of the track. In this discussion we assume there are 5 transition points in addition to the decision point at 362.

Boxes at 366 and 368 show the number of frames to transition from a given frame in sequence A to sequences B and C, respectively. Thus, at frame A95 there are 20 frames that need to be generated in order to transition to frame B101 if the user selects sequence B at the time frame A95 is displayed. Similarly 18 frames are needed to go from frame A96 to frame B101, 19 frames are needed to go from frame A95 to frame C101, 15 frames are needed to go from frame A96 to frame C101, etc. Note that the number of frames needed to transition generally decreases as the decision point is neared although this isn't necessarily true. For example, where the transitions are as discussed above, i.e., the character is continuously typing in sequence A, in sequence B the character smashes the keyboard and in sequence C the character gets up and goes home, the characters hands may be closer to the clenched fist position in frame A97 in frame A98. This explains why 8 frames are needed to transition from frame A98 to sequence B while only 4 frames are needed to transition from frame A97 to sequence B.

Also, while the sequence of typing is fairly uniform (and boring) in that the character displays few, if any, major movements, such actions as the character moving a hand to do a shift operation to capitalize a letter, or to move a hand off of the keyboard entirely to pause for a second could require a sequence of frames to bring the hand back to the keyboard position in order to match up with the clenched fist frames of sequence B.

The total number of frames in the multi point transitions from sequence A to B or C is 10+9+4+8+5+8+5+9+5+2=65 frames. These must be written to the CD-ROM disc in the six intervals at 370. In order to achieve this density there must be an average of about 10.8 frames per interval. This is far more than the four frames per interval previously used in the time stepped path switching discussed above.

The density of 10.8 frames per interval can be reduced by only permitting transitions every other frame. This would expand the number of intervals by a factor of about 2 so that the frame density is about 5.4 frames per interval. The tradeoff is that the response to the user's input has a delay of $\frac{1}{15}$ second. Expanding the number of intervals by 4 reduces the density to 2.7 frames per interval and makes the delay about 0.13 seconds. Re-synchronizing and time shifting of the transition sequences would be required along the lines of the discussion above in connection with time stepped path switching and FIG. 8.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention may be modified without departing from the scope of the invention. Many such changes or modifications will be readily apparent to one of ordinary skill in the art. The specification and drawings are, accordingly, to be regarded in an illustrative rather than a restrictive sense, the invention being limited only by the provided claims.

I claim:

1. A method for creating an interactive production on a medium having a spiral data track, comprising the following steps:

creating a first animation sequence of digital frames showing a first action;

creating a second animation sequence of digital frames for selectively display in place of the first animation sequence, wherein the second animation sequence is a selectable path in the interactive production and shows a second action;

writing the first and second animation sequences of frames to the medium by interleaving the frames of the first animation sequence with the frames of the second animation sequence to create the interactive production; and wherein a computer system is used to play back the interactive production, wherein the computer system comprises a processor, user input device, display screen, and a drive for reading the medium, the method further comprising the following steps performed under the control of the processor:

continuously reading the interleaved frames from the medium;

displaying only the frames of the first animation sequence on the display screen to play back the first animation;

accepting signals from the user input device selecting the second animation sequence; and in response to the signals from the user input device, displaying only the frames of the second animation sequence on the display screen to play back the second animation.

2. The method of claim 1, further comprising the following steps:

prior to the "writing the first and second animation sequences" step, compressing one or more of the digital frames;

wherein the "writing the first and second animation sequences" step further includes the substep of writing the compressed digital frames to the medium; and decompressing a frame prior to displaying the frame on the display screen.

3. The method of claim 1, further comprising the steps of:

writing a tag, wherein the tag indicates that data representing one or more frames belongs to a specific sequence; and using the tag during the play back of the interactive production to determine whether to display the associated data representing one or more frames.

4. The method of claim 3, wherein the computer system includes memory comprising a buffer, wherein frames are stored into the buffer prior to display on the display device, the method further comprising the step of:

using the tag to prevent loading of the associated data representing one or more frames into the buffer.

5. A method for playing back an interactive production recorded on a medium having a spiral data track, wherein the medium includes a first animation sequence of digital frames interleaved with frames from a second animation sequence of digital frames, wherein the medium further includes identification information associated with data describing the frames, wherein a computer system is used to play back the interactive production, wherein the computer system comprises a processor, user input device, display screen memory including a buffer, and drive for reading the medium, the method further comprising the following steps performed under the control of the processor:

continuously reading the interleaved frames and identification information from the medium;

using the identification information to store only frames of the first animation sequence into the buffer and to skip frames of the second animation sequence so that the skipped frames of the second animation sequence are not stored in the buffer;

displaying the frames in the buffer on the display screen to play back the first animation;

accepting signals from the user input device selecting the second animation sequence; and in response to the signals from the user input device performing the following steps:

continuously reading the interleaved frames and identification information from the medium, using the identification information to store frames of the second animation sequence into the buffer and to skip frames of the first animation sequence so that the skipped flames of the first animation sequence are not stored in the buffer; and displaying the frames in the buffer on the display screen to play back the second animation.

6. The method of claim 5, wherein the identification information comprises:

a tag for indicating that one or more frames are from a particular sequence.

7. An apparatus for playing back an interactive production stored on a medium having a spiral data track, wherein the medium includes frames corresponding to a first animation sequence showing a first action interleaved with frames corresponding to a second animation sequence showing a second action to produce a series of frames wherein adjacent frames in the series correspond to different animation sequences, the apparatus comprising:

a computer system including a processor, user input device and display screen;

a drive for reading the medium coupled to the computer system for retrieving frames from the series of frames on the medium;

means responsive to signals from the user input device to output a select signal indicating the selection of the second sequence;

selection means for selectively storing the interleaved frames while the interleaved frames are contiguously read from the medium; and displaying means coupled to the selection means for displaying on the display screen frames corresponding to the first animation sequence, and, upon generation of the select signal, for displaying on the display screen frames corresponding to the second animation sequence in place of displaying one or more frames corresponding to the first animation sequence.

8. The apparatus of claim 7, wherein the frames in the series are compressed, the apparatus further comprising:

selection means responsive to signals from the user input device to output a select signal indicating the selection of the second sequence; and decompression means for selectively decompressing frames in response to the select signal, wherein only frames corresponding to the first animation sequence are decompressed unless the select signal is present, in which case only frames corresponding to the second animation sequence are decompressed.

9. An apparatus for playing back an interactive production stored on a medium having a spiral data track, wherein the medium includes frames corresponding to a first animation sequence shwoing a first action interleaved with frames corresponding to a second animation sequence to produce a series of frames wherein adjacent frames in the series correspond to different animation sequences, the medium further including tags associated with one or more frames on the medium, wherein the tags indicate which sequence the one or more frames associated with a given tag belongs to, the apparatus comprising:

a computer system including a processor, user input device and a display screen;

a drive for reading the medium coupled to the computer system for retrieving frames from the series of frames on the medium;

means for reading the tags from the medium;

means responsive to signals from the user input device to select an animation sequence; and means for using the tags to buffer and display frames from the selected animation sequence while skipping frames from the other non-selected animation sequence so that the skipped frames are not buffered.

\* \* \* \* \*